United States Patent
Bai et al.

(10) Patent No.: US 12,289,720 B2
(45) Date of Patent: Apr. 29, 2025

(54) TRANSMISSION CONFIGURATION DETERMINATION FOR GRANT-FREE TRANSMISSIONS IN FULL-DUPLEX SYSTEMS

(71) Applicant: QUALCOMM Incorporated, San Diego, CA (US)

(72) Inventors: Tianyang Bai, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/492,441

(22) Filed: Oct. 1, 2021

(65) Prior Publication Data
US 2022/0110137 A1 Apr. 7, 2022

Related U.S. Application Data

(60) Provisional application No. 63/087,848, filed on Oct. 5, 2020.

(51) Int. Cl.
*H04W 72/1263* (2023.01)
*H04L 5/16* (2006.01)
(Continued)

(52) U.S. Cl.
CPC ........ *H04W 72/1263* (2013.01); *H04L 5/16* (2013.01); *H04W 72/0446* (2013.01); *H04W 72/23* (2023.01); *H04W 72/51* (2023.01)

(58) Field of Classification Search
CPC . H04W 72/1263; H04W 72/51; H04W 72/23; H04W 72/0446; H04L 5/16
See application file for complete search history.

(56) References Cited

U.S. PATENT DOCUMENTS 5,218,680 A 6/1993 Farrell et al.
8,160,101 B2 4/2012 Kwak et al.
(Continued)

FOREIGN PATENT DOCUMENTS

EP 3637836 A1 4/2020
WO WO-2015096027 A1 7/2015
(Continued)

OTHER PUBLICATIONS

Catt: "TDD Inter-Band Carrier Aggregation", 3GPP Draft, R1-121081, 3GPP TSG RAN WG1 Meeting #68bis, 3rd Generation Partnership Project (3GPP), Mobile Competence Centre, 650, Route Des Lucioles, F-06921 Sophia-Antipolis Cedex, France, vol. RAN WG1, No. Jeju, Korea, Mar. 26, 2012-Mar. 30, 2012, Mar. 20, 2012 (Mar. 20, 2012), XP050599384, 5 Pages, [retrieved on Mar. 20, 2012] Section 2.2.
(Continued)

*Primary Examiner* — Jael M Ulysse
(74) *Attorney, Agent, or Firm* — Holland & Hart/QUALCOMM Incorporated

(57) ABSTRACT

Methods, systems, and devices for wireless communications are described. Generally, the described techniques provide for adapting a configuration for transmitting or receiving a semi-persistent transmission to minimize self-interference when appropriate and maximize throughput. A first device and a second device may determine whether the semi-persistent transmission overlaps in a time domain with a dynamic transmission. If the semi-persistent transmission overlaps in the time domain with the dynamic transmission, the first device and the second device may use a full-duplex configuration to transmit or receive the semi-persistent transmission. Alternatively, if the semi-persistent transmission fails to overlap in a time domain with a dynamic transmission, the first device and the second device may use
(Continued)

a half-duplex configuration to transmit or receive the semi-persistent transmission.

38 Claims, 18 Drawing Sheets

(51) Int. Cl.
*H04W 72/0446* (2023.01)
*H04W 72/23* (2023.01)
*H04W 72/51* (2023.01)

(56) References Cited

U.S. PATENT DOCUMENTS

| | | | |
|---|---|---|---|
| 9,572,063 | B2 | 2/2017 | Etemad et al. |
| 9,641,309 | B2 | 5/2017 | Ko et al. |
| 11,271,625 | B2 | 3/2022 | Park et al. |
| 11,588,585 | B2 | 2/2023 | Shao et al. |
| 11,736,986 | B2 | 8/2023 | Kung et al. |
| 2009/0249153 | A1 | 10/2009 | Zhang |
| 2011/0292843 | A1* | 12/2011 | Gan ............... H04B 7/15557 370/277 |
| 2013/0223294 | A1* | 8/2013 | Karjalainen .......... H04L 5/1438 370/277 |
| 2015/0304883 | A1 | 10/2015 | Tabet et al. |
| 2016/0105878 | A1* | 4/2016 | Zhao ................... H04L 5/0055 370/329 |
| 2016/0242176 | A1 | 8/2016 | Sun et al. |
| 2017/0026942 | A1* | 1/2017 | Vajapeyam ............ H04W 72/23 |
| 2017/0054544 | A1* | 2/2017 | Kazmi ..................... H04L 5/14 |
| 2017/0289733 | A1* | 10/2017 | Rajagopal ............. H04L 5/0082 |
| 2017/0295594 | A1* | 10/2017 | Ozturk .................. H04W 72/23 |
| 2018/0007667 | A1* | 1/2018 | You ...................... H04L 5/0051 |
| 2018/0098349 | A1* | 4/2018 | Sun ....................... H04W 72/20 |
| 2018/0123710 | A1* | 5/2018 | Kim ....................... H04B 1/12 |
| 2018/0160445 | A1* | 6/2018 | Babaei ................ H04W 72/044 |
| 2018/0352582 | A1* | 12/2018 | Yi ....................... H04W 74/006 |
| 2019/0075585 | A1* | 3/2019 | Deogun ................ H04W 72/23 |
| 2019/0104539 | A1* | 4/2019 | Park ..................... H04W 72/23 |
| 2019/0132838 | A1* | 5/2019 | Yi ........................ H04L 5/0055 |
| 2019/0335471 | A1 | 10/2019 | Kim et al. |
| 2019/0373588 | A1* | 12/2019 | Bae ...................... H04L 5/0044 |
| 2020/0145998 | A1 | 5/2020 | Sun et al. |
| 2020/0154440 | A1* | 5/2020 | Gholmieh ............... H04W 4/40 |
| 2020/0235980 | A1 | 7/2020 | John Wilson et al. |
| 2020/0245335 | A1 | 7/2020 | Joseph et al. |
| 2020/0296701 | A1* | 9/2020 | Park ..................... H04L 1/1896 |
| 2020/0313837 | A1 | 10/2020 | Vejlgaard et al. |
| 2020/0404684 | A1 | 12/2020 | Lee et al. |
| 2021/0058967 | A1 | 2/2021 | Oteri et al. |
| 2021/0259000 | A1 | 8/2021 | Khoshnevisan et al. |
| 2021/0321413 | A1* | 10/2021 | Shin ................... H04W 56/0045 |
| 2021/0344455 | A1* | 11/2021 | Choi ..................... H04L 1/1896 |
| 2021/0351881 | A1* | 11/2021 | Park ..................... H04W 72/04 |
| 2021/0377926 | A1* | 12/2021 | Li ....................... H04W 72/044 |
| 2022/0022195 | A1* | 1/2022 | Bruun ................. H04W 72/542 |
| 2022/0039115 | A1* | 2/2022 | Sun .................... H04W 72/1263 |
| 2022/0069884 | A1 | 3/2022 | Zhang et al. |
| 2022/0078728 | A1 | 3/2022 | Yi et al. |
| 2022/0094484 | A1 | 3/2022 | Babaei |
| 2022/0095083 | A1 | 3/2022 | Yeo et al. |
| 2022/0109550 | A1 | 4/2022 | Bai et al. |
| 2022/0109551 | A1 | 4/2022 | Bai et al. |
| 2022/0109553 | A1 | 4/2022 | Bai et al. |
| 2022/0110117 | A1 | 4/2022 | Bai et al. |
| 2022/0124741 | A1 | 4/2022 | Elshafie et al. |
| 2022/0182160 | A1 | 6/2022 | Su et al. |
| 2023/0032475 | A1* | 2/2023 | Bae ...................... H04L 5/0044 |
| 2023/0098368 | A1* | 3/2023 | Yu ..................... H04W 72/0446 370/281 |
| 2023/0148282 | A1* | 5/2023 | Marinier ........... H04W 72/0446 370/329 |

FOREIGN PATENT DOCUMENTS

| | | |
|---|---|---|
| WO | WO-2017029292 A1 | 2/2017 |
| WO | WO-2017172165 A1 | 10/2017 |
| WO | WO-2018058455 A1 | 4/2018 |
| WO | WO-2019032882 A1 | 2/2019 |
| WO | WO-2020197645 A1 | 10/2020 |

OTHER PUBLICATIONS

International Search Report and Written Opinion—PCT/US2021/053373—ISA/EPO—Feb. 11, 2022.
Qualcomm Incorporated: "Multi-TRP Enhancements", 3GPP Draft, 3GPP TSG-RAN WG1 Meeting #98, R1-1909272 Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765877, 32 Pages, Retrieved from the Internet: URL: http://www.3gpp.org/ftp/tsg_ran/WG1_RL1/TSGR1_98/Docs/R1-1909272.zip [retrieved on Aug. 17, 2019] PDCCH Related Enhancements, p. 1, Paragraph 3.2, Section 4.1.2, p. 21-p. 23, Figure 12.

* cited by examiner

TRANSMISSION CONFIGURATION DETERMINATION FOR GRANT-FREE TRANSMISSIONS IN FULL-DUPLEX SYSTEMS

CROSS REFERENCE

The present application for patent claims the benefit of U.S. Provisional Patent Application No. 63/087,848 by BAI et al., entitled "TRANSMISSION CONFIGURATION DETERMINATION FOR GRANT-FREE TRANSMISSIONS IN FULL-DUPLEX SYSTEMS," filed Oct. 5, 2020, assigned to the assignee hereof, and expressly incorporated by reference herein.

INTRODUCTION

The following relates to wireless communications in wireless communication systems, including managing wireless communications in half duplex and full duplex wireless communication systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include receiving control signaling allocating resources to the first device for one or more semi-persistent transmissions in a first link direction and communicating a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

An apparatus for wireless communication at a first device is described. The apparatus may include a processor, and memory coupled to the processor, the processor and the memory configured to receive control signaling allocating resources to the first device for one or more semi-persistent transmissions in a first link direction and communicate a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

Another apparatus for wireless communication at a first device is described. The apparatus may include means for receiving control signaling allocating resources to the first device for one or more semi-persistent transmissions in a first link direction and means for communicating a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

A non-transitory computer-readable medium storing code for wireless communication at a first device is described. The code may include instructions executable by a processor to receive control signaling allocating resources to the first device for one or more semi-persistent transmissions in a first link direction and communicate a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

Some examples of the method, apparatuses, and non-transitory computer-readable medium described herein may further include operations, features, means, or instructions for receiving, in the control signaling, a full-duplex configuration and a half-duplex configuration for communicating the semi-persistent transmission.

Some examples of the method, apparatuses, and non-transitory computer-readable medium described herein may further include operations, features, means, or instructions for identifying the full-duplex configuration for communicating the semi-persistent transmission based at least in part on the semi-persistent transmission in the first link direction overlapping in the time domain with the dynamic transmission in the second link direction and identifying the half-duplex configuration for communicating the semi-persistent transmission based at least in part on the semi-persistent transmission in the first link direction failing to overlap in the time domain with the dynamic transmission in the second link direction.

In some examples of the method, apparatuses, and non-transitory computer-readable medium described herein, the full-duplex configuration and the half-duplex configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for receiving downlink control information scheduling the dynamic transmission in the second link direction and determining that the semi-persistent transmission overlaps in the time domain with the dynamic transmission based on receiving the downlink control information.

Some examples of the method, apparatuses, and non-transitory computer-readable medium described herein may further include operations, features, means, or instructions for receiving, in the downlink control information, an indication of a pair of configurations including a first configuration for communicating the dynamic transmission in the second link direction and a second configuration for communicating the semi-persistent transmission in the first link direction and identifying the second configuration for communicating the semi-persistent transmission based on receiving the indication of the pair of configurations in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for receiving, in the downlink control information, an indication of a first configuration for communicating the dynamic transmission in the second link direction and identifying a second configuration for communicating the semi-persistent transmission based on the first configuration indicated in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof.

In some examples of the method, apparatuses, and non-transitory computer-readable medium described herein, a pairing between a first beam in the first configuration and a second beam in the second configuration may be predefined, a relationship between the first configuration and the second configuration may be predefined, or a combination thereof.

In some examples of the method, apparatuses, and non-transitory computer-readable medium described herein, the downlink control information schedules the dynamic transmission in the second link direction to the first device.

In some examples of the method, apparatuses, and non-transitory computer-readable medium described herein, and the method, apparatuses, and non-transitory computer-readable medium may include further operations, features, means, or instructions for where the first link direction includes downlink and the second link direction includes uplink, the semi-persistent transmission including a semi-persistent scheduling transmission.

In some examples of the method, apparatuses, and non-transitory computer-readable medium described herein, the first device includes a user equipment or a distributed unit, and the second device includes a base station or a centralized unit.

A method for wireless communication at a second device is described. The method may include transmitting, to a first device, control signaling allocating resources for one or more semi-persistent transmissions in a first link direction and communicating a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

An apparatus for wireless communication at a second device is described. The apparatus may include a processor, and memory coupled to the processor, the processor and the memory configured to transmit, to a first device, control signaling allocating resources for one or more semi-persistent transmissions in a first link direction and communicate a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

Another apparatus for wireless communication at a second device is described. The apparatus may include means for transmitting, to a first device, control signaling allocating resources for one or more semi-persistent transmissions in a first link direction and means for communicating a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

A non-transitory computer-readable medium storing code for wireless communication at a second device is described. The code may include instructions executable by a processor to transmit, to a first device, control signaling allocating resources for one or more semi-persistent transmissions in a first link direction and communicate a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

Some examples of the method, apparatuses, and non-transitory computer-readable medium described herein may further include operations, features, means, or instructions for transmitting, in the control signaling, a full-duplex configuration and a half-duplex configuration for the first device to use to communicate the semi-persistent transmission.

Some examples of the method, apparatuses, and non-transitory computer-readable medium described herein may further include operations, features, means, or instructions for identifying that the first device may be to use the full-duplex configuration to communicate the semi-persistent transmission based at least in part on the semi-persistent transmission in the first link direction overlapping in the time domain with the dynamic transmission in the second link direction and identifying that the first device may be to use the half-duplex configuration to communicate the semi-persistent transmission based at least in part on the semi-persistent transmission in the first link direction failing to overlap in the time domain with the dynamic transmission in the second link direction.

In some examples of the method, apparatuses, and non-transitory computer-readable medium described herein, the full-duplex configuration and the half-duplex configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for transmitting downlink control information scheduling the dynamic transmission in the second link direction and determining that the semi-persistent transmission overlaps in the time domain with the dynamic transmission based on transmitting the downlink control information.

Some examples of the method, apparatuses, and non-transitory computer-readable medium described herein may further include operations, features, means, or instructions for transmitting, in the downlink control information, an indication of a pair of configurations including a first configuration to be used by the first device to transmit or receive the dynamic transmission in the second link direction and a second configuration to be used by the first device to use to transmit or receive the semi-persistent transmission in the first link direction and identifying that the first device may be to use the second configuration for communicating the semi-persistent transmission based on transmitting the indication of the pair of configurations in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for transmitting, in the downlink control information, an indication of a first configuration to be used by the first device to communicate the dynamic transmission in the second link direction and identifying that the first device may be to use a second configuration to transmit or receive the semi-persistent transmission based on the first configuration indicated in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof.

In some examples of the method, apparatuses, and non-transitory computer-readable medium described herein, a pairing between a first beam in the first configuration and a second beam in the second configuration may be predefined, a relationship between the first configuration and the second configuration may be predefined, or a combination thereof.

In some examples of the method, apparatuses, and non-transitory computer-readable medium described herein, the downlink control information schedules the dynamic transmission in the second link direction from the second device to the first device.

In some examples of the method, apparatuses, and non-transitory computer-readable medium described herein, and the method, apparatuses, and non-transitory computer-readable medium may include further operations, features, means, or instructions for where the first link direction includes downlink and the second link direction includes uplink, the semi-persistent transmission including a semi-persistent scheduling transmission.

In some examples of the method, apparatuses, and non-transitory computer-readable medium described herein, the first device includes a user equipment (UE) or a distributed unit, and the second device includes a base station or a centralized unit.

A method of wireless communication at a UE is described. The method may include receiving control signaling allocating resources to the UE for one or more semi-persistent transmissions in a first link direction, the first link direction including an uplink or a downlink, determining whether a semi-persistent transmission of the one or more semi-persistent transmissions overlaps in a time domain with a dynamic transmission in a second link direction, the second link direction being different from the first link direction, identifying a configuration for transmitting or receiving the semi-persistent transmission based on the determining, and transmitting or receiving the semi-persistent transmission using the identified configuration.

An apparatus for wireless communication at a UE is described. The apparatus may include a processor, and memory coupled to the processor, the processor and the memory configured to receive control signaling allocating resources to the UE for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration for transmitting or receiving the semi-persistent transmission based on the determining, and transmit or receiving the semi-persistent transmission using the identified configuration.

Another apparatus for wireless communication at a UE is described. The apparatus may include means for receiving control signaling allocating resources to the UE for one or more semi-persistent transmissions in a first link direction, the first link direction including an uplink or a downlink, determining whether a semi-persistent transmission of the one or more semi-persistent transmissions overlaps in a time domain with a dynamic transmission in a second link direction, the second link direction being different from the first link direction, identifying a configuration for transmitting or receiving the semi-persistent transmission based on the determining, and transmitting or receiving the semi-persistent transmission using the identified configuration.

A non-transitory computer-readable medium storing code for wireless communication at a UE is described. The code may include instructions executable by a processor to receive control signaling allocating resources to the UE for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration for transmitting or receiving the semi-persistent transmission based on the determining, and transmit or receiving the semi-persistent transmission using the identified configuration.

Some examples of the method, apparatuses, and non-transitory computer-readable medium described herein may further include operations, features, means, or instructions for receiving, in the control signaling, a full-duplex configuration and a half-duplex configuration for transmitting or receiving the semi-persistent transmission, where identifying the configuration for transmitting or receiving the semi-persistent transmission based on the determining may include operations, features, means, or instructions for identifying the full-duplex configuration or the half-duplex configuration for transmitting or receiving the semi-persistent transmission based at least in part on the determining.

In some examples of the method, apparatuses, and non-transitory computer-readable medium described herein, identifying the full-duplex configuration or the half-duplex configuration for transmitting or receiving the semi-persistent transmission based on the determining may include operations, features, means, or instructions for identifying the full-duplex configuration for transmitting or receiving the semi-persistent transmission if the semi-persistent transmission in the first link direction overlaps in the time domain with the dynamic transmission in the second link direction, and identifying the half-duplex configuration for transmitting or receiving the semi-persistent transmission if the semi-persistent transmission in the first link direction fails to overlap in the time domain with the dynamic transmission in the second link direction.

In some examples of the method, apparatuses, and non-transitory computer-readable medium described herein, the full-duplex configuration and the half-duplex configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for receiving downlink control information scheduling the dynamic transmission in the second link direction, where determining whether the semi-persistent transmission overlaps in the time domain with the dynamic transmission may include operations, features, means, or instructions for determining that the semi-persistent transmission overlaps in the time domain with the dynamic transmission based at least in part on receiving the downlink control information.

Some examples of the method, apparatuses, and non-transitory computer-readable medium described herein may further include operations, features, means, or instructions for receiving, in the downlink control information, an indication of a pair of configurations including a first configuration for transmitting or receiving the dynamic transmission in the second link direction and a second configuration for transmitting or receiving the semi-persistent transmission in the first link direction and, where identifying the configuration for transmitting or receiving the semi-persistent transmission may include operations, features, means, or instructions for identifying the second configuration for transmitting or receiving the semi-persistent transmission based at least in part on receiving the indication of the pair of configurations in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for receiving, in the downlink control information, an indication of a first configuration for transmitting or receiving the dynamic transmission in the second link direction, where identifying the configuration for transmitting or receiving the semi-persistent transmission may include operations, features, means, or instructions for identifying a second configuration for transmitting or receiving the semi-persistent transmission based at least in part on the first configuration indicated in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof. In some examples of the method, apparatuses, and non-transitory computer-readable medium described herein, a pairing between a first beam in the first configuration and a second beam in the second configuration may be predefined. In some examples of the method, apparatuses, and non-transitory computer-readable medium described herein, a relationship between the first configuration and the second configuration may be predefined.

In some examples of the method, apparatuses, and non-transitory computer-readable medium described herein, the downlink control information schedules the dynamic transmission in the second link direction to the UE. In some examples of the method, apparatuses, and non-transitory computer-readable medium described herein, the first link direction includes uplink and the second link direction includes downlink, or the first link direction includes downlink and the second link direction includes uplink.

A method of wireless communication at a base station is described. The method may include transmitting, to a UE, control signaling allocating resources for one or more semi-persistent transmissions in a first link direction, the first link direction including an uplink or a downlink, determining whether a semi-persistent transmission of the one or more semi-persistent transmissions overlaps in a time domain with a dynamic transmission in a second link direction, the second link direction being different from the first link direction, identifying a configuration to be used by the UE to transmit or receive the semi-persistent transmission based on the determining, and transmitting or receiving the semi-persistent transmission using a complementary configuration to the identified configuration.

An apparatus for wireless communication at a base station is described. The apparatus may include a processor, and memory coupled to the processor, the processor and the memory configured to transmit, to a UE, control signaling allocating resources for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration to be used by the UE to transmit or receive the semi-persistent transmission based on the determining, and transmit or receiving the semi-persistent transmission using a complementary configuration to the identified configuration.

Another apparatus for wireless communication at a base station is described. The apparatus may include means for transmitting, to a UE, control signaling allocating resources for one or more semi-persistent transmissions in a first link direction, the first link direction including an uplink or a downlink, determining whether a semi-persistent transmission of the one or more semi-persistent transmissions overlaps in a time domain with a dynamic transmission in a second link direction, the second link direction being different from the first link direction, identifying a configuration to be used by the UE to transmit or receive the semi-persistent transmission based on the determining, and transmitting or receiving the semi-persistent transmission using a complementary configuration to the identified configuration.

A non-transitory computer-readable medium storing code for wireless communication at a base station is described. The code may include instructions executable by a processor to transmit, to a UE, control signaling allocating resources for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration to be used by the UE to transmit or receive the semi-persistent transmission based on the determining, and transmit or receiving the semi-persistent transmission using a complementary configuration to the identified configuration.

Some examples of the method, apparatuses, and non-transitory computer-readable medium described herein may further include operations, features, means, or instructions for transmitting, in the control signaling, a full-duplex configuration and a half-duplex configuration for the UE to use to transmit or receive the semi-persistent transmission, where identifying the configuration to be used by the UE to transmit or receive the semi-persistent transmission based on the determining may include operations, features, means, or instructions for identifying that the UE is to use the full-duplex configuration or the half-duplex configuration to transmit or receive the semi-persistent transmission based at least in part on the determining.

In some examples of the method, apparatuses, and non-transitory computer-readable medium described herein, identifying that the UE is to use the full-duplex configuration or the half-duplex configuration to transmit or receive the semi-persistent transmission based on the determining may include operations, features, means, or instructions for identifying that the UE is to use the full-duplex configuration to transmit or receive the semi-persistent transmission if the semi-persistent transmission in the first link direction overlaps in the time domain with the dynamic transmission in the second link direction, and identifying that the UE is to use the half-duplex configuration to transmit or receive the semi-persistent transmission if the semi-persistent transmission in the first link direction fails to overlap in the time domain with the dynamic transmission in the second link direction.

In some examples of the method, apparatuses, and non-transitory computer-readable medium described herein, the full-duplex configuration and the half-duplex configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for transmitting downlink control information scheduling the dynamic transmission in the second link direction, where determining whether the semi-persistent transmission overlaps in the time domain with the dynamic transmission may include operations, features, means, or instructions for determining that the semi-persistent transmission overlaps in the time domain with the dynamic transmission based at least in part on transmitting the downlink control information.

Some examples of the method, apparatuses, and non-transitory computer-readable medium described herein may further include operations, features, means, or instructions for transmitting, in the downlink control information, an indication of a pair of configurations including a first configuration to be used by the UE to transmit or receive the dynamic transmission in the second link direction and a second configuration to be used by the UE to use to transmit or receive the semi-persistent transmission in the first link direction and, where identifying the configuration to be used by the UE to transmit or receive the semi-persistent transmission may include operations, features, means, or instructions for identifying that the UE is to use the second configuration for transmitting or receiving the semi-persistent transmission based at least in part on transmitting the indication of the pair of configurations in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof.

Some examples of the method, apparatuses, and non-transitory computer-readable medium described herein may further include operations, features, means, or instructions for transmitting, in the downlink control information, an indication of a first configuration to be used by the UE to transmit or receive the dynamic transmission in the second link direction, where identifying the configuration to be used by the UE to transmit or receive the semi-persistent transmission may include operations, features, means, or instructions for identifying that the UE is to use a second configuration to transmit or receive the semi-persistent transmission based at least in part on the first configuration indicated in the downlink control information.

In some examples of the method, apparatuses, and non-transitory computer-readable medium described herein, the first configuration and the second configuration include different beams, different modulation and coding schemes, different precoding matrix indicators, different rank indicators, or a combination thereof. In some examples of the method, apparatuses, and non-transitory computer-readable medium described herein, a pairing between a first beam in the first configuration and a second beam in the second configuration may be predefined. In some examples of the method, apparatuses, and non-transitory computer-readable medium described herein, a relationship between the first configuration and the second configuration may be predefined.

In some examples of the method, apparatuses, and non-transitory computer-readable medium described herein, the downlink control information schedules the dynamic transmission in the second link direction from the base station to the UE. In some examples of the method, apparatuses, and non-transitory computer-readable medium described herein, the first link direction includes uplink and the second link direction includes downlink, or the first link direction includes downlink and the second link direction includes uplink.

DETAILED DESCRIPTION

Figure 1:
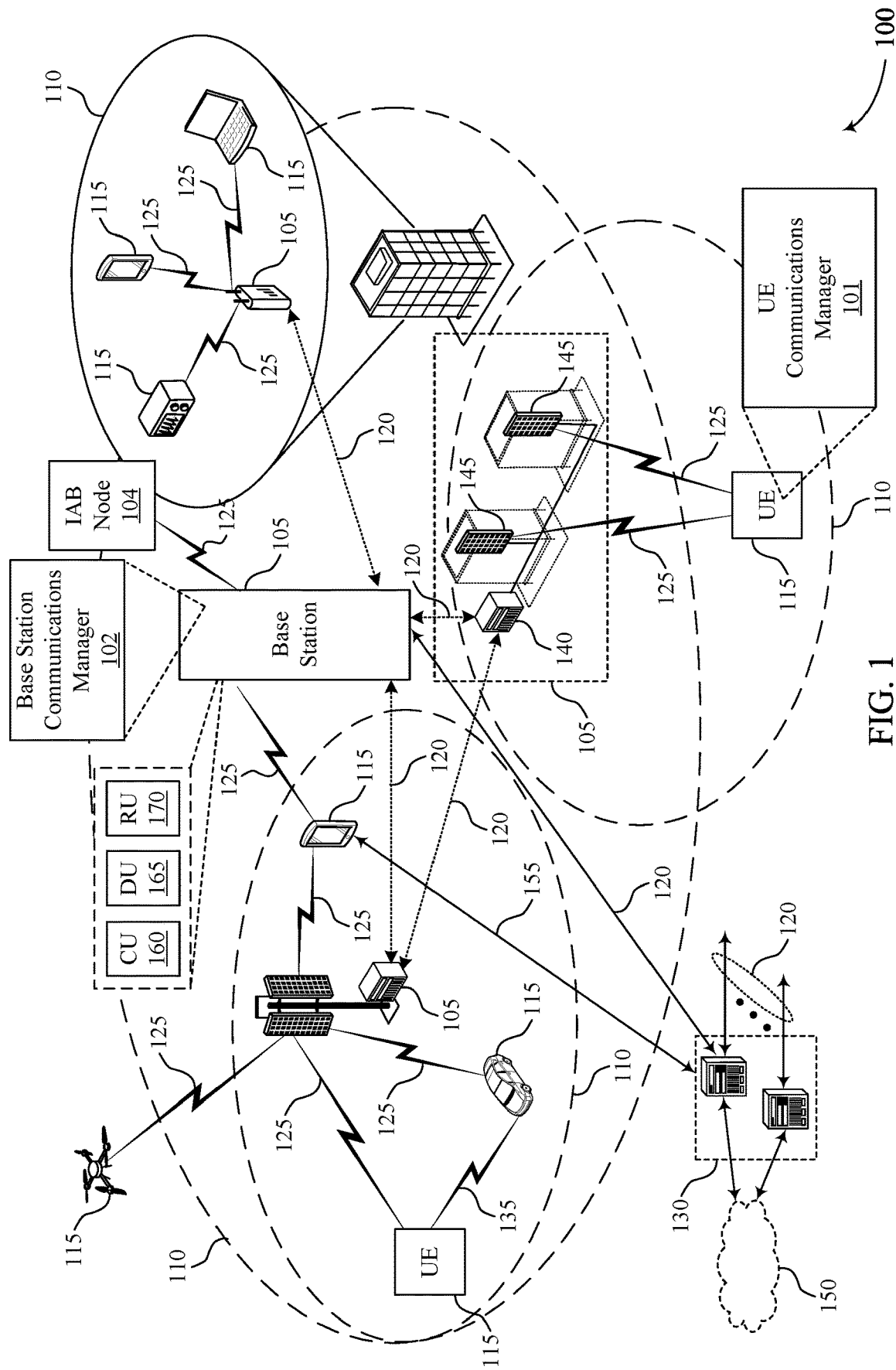
FIG. 1 illustrates an example of a wireless communications system that supports transmission configuration determination for grant-free transmissions in full-duplex systems in accordance with one or more aspects of the present disclosure.

A wireless communications system may include a communication device, such as a UE or a base station (e.g., an eNodeB (eNB), a next-generation NodeB or a giga-NodeB, either of which may be referred to as a gNB, or some other base station), that supports wireless communications over one or multiple radio access technologies. Examples of radio access technologies include 4G systems, such as LTE systems, and 5G systems, which may be referred to as NR systems. The communication device may operate in a half-duplex mode or a full-duplex mode, or a combination thereof. For example, in a half-duplex mode, a UE may either transmit uplink communications or receive downlink communications during a transmission time interval (TTI). In the full-duplex mode, the UE may simultaneously transmit uplink communications and receive downlink communications during the TTI. A TTI may span one or more time resources (e.g., symbols, mini-slots, slot, etc.). As described herein, simultaneous wireless communication by a base station or a UE, or both, may include uplink transmission, uplink reception, downlink transmission, or downlink reception, or a combination thereof, that occurs at the same time (e.g., a symbol period, a mini-slot, a slot, etc.). In some examples, the simultaneous wireless communication may be referred to as overlapping communications (e.g., a semi-persistent transmission overlapping in time with a dynamic transmission may be communicated in a same or overlapping time duration).

A communication device (e.g., a base station, a UE, etc.) may be configured with multiple antennas, which may be used to transmit and receive communications while operating in a full-duplex mode. In some cases, the communication device may be configured with multiple antennas panels for uplink communications and downlink communications. In some cases, the communication device may experience self-interference as a result of using the multiple antenna panels for the uplink communication and the downlink communications (e.g., in a full-duplex mode) at a same time. In some cases, the self-interference may occur due to signal leakage between a transmit antenna and a receive antenna.

As an illustrative example, when communicating in a full-duplex mode, a UE may experience such self-interference. Self-interference may refer to interference caused by uplink transmissions from the UE on downlink transmissions to the UE or interference caused by downlink transmissions to the UE on uplink transmission from the UE (e.g., between transmitted and received signals). Accordingly, it may be appropriate for the UE to adapt configurations used for full-duplex communications to minimize self-interference. In some cases, however, a base station may semi-statically allocate resources and set configurations for some transmissions. Such transmissions may be referred to as semi-persistent transmissions. In such cases, at the time of allocating the resources and setting the configurations, the base station may be unaware of whether the transmissions may overlap with other transmissions in an opposite link direction. That is, the base station may be unaware of whether a UE may transmit or receive the semi-persistent transmissions in a full-duplex mode or half-duplex mode, which may result in relatively inefficient communications in a wireless communications system.

As described herein, a UE and a base station in a wireless communications system may support techniques for adapting a configuration for transmitting or receiving a semi-persistent transmission. In particular, the UE and the base station may determine whether the semi-persistent transmission overlaps in a time domain with a dynamic transmission. If the semi-persistent transmission overlaps in the time domain with the dynamic transmission, the UE and the base station may use a full-duplex configuration to transmit or receive the semi-persistent transmission (e.g., a configuration that minimizes self-interference between the semi-persistent transmission and the dynamic transmission). Alternatively, if the semi-persistent transmission fails to overlap in a time domain with a dynamic transmission, the UE and the base station may use a half-duplex configuration to transmit or receive the semi-persistent transmission (e.g., a configuration that maximizes throughput without considering the possibility of self-interference).

In some examples, the various devices may use complementary configurations as described herein. For example, a UE may identify a configuration for transmitting the semi-persistent transmission based on whether the transmission overlaps in a time domain with a dynamic transmission. The base station may identify a complementary configuration to the configuration used by the UE. As an illustrative example, the base station may select, indicate, or both, various parameters of the configurations such as resources, beams, communications parameters (e.g., modulation and coding scheme, a precoding matrix, and the like), or any combination thereof, among other examples of parameters and configurations. Thus, each device may use a configuration that corresponds (e.g., complements) the configuration used by the other device.

Aspects of the subject matter described in the disclosure may be implemented to realize one or more of the following potential improvements, among others. The techniques employed by a communications device (e.g., a UE or base station) may provide enhancements to the operation of the communications device, such as for duplex communications. In some examples, configuring the communication device to support techniques for adapting a configuration used to transmit or receive a semi-persistent transmission may support improvements to power consumption, spectral efficiency, and, in some examples, may promote higher reliability and lower latency duplex communications, among other benefits.

Aspects of the disclosure introduced above are described below in the context of a wireless communications system. Examples of processes and signaling exchanges that support transmission configuration determination for grant-free transmissions in full-duplex systems are then described. Aspects of the disclosure are further illustrated by and described with reference to apparatus diagrams, system diagrams, and flowcharts that relate to transmission configuration determination for grant-free transmissions in full-duplex systems.

FIG. 1 illustrates an example of a wireless communications system 100 that supports transmission configuration determination for grant-free transmissions in full-duplex systems in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunications system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

A UE 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some UEs 115 may support a full-duplex mode. A full-duplex mode may refer to a mode that supports two-way communication via simultaneous transmission and reception. The full-duplex mode is an emerging technique which is capable of theoretically doubling link capacity by enabling radio network nodes to transmit and receive simultaneously on the same frequency and time radio resource. Full-duplex breaks half-duplex operation constraints where transmission and reception either differ in time or in frequency. A full-duplex network node, such as a base station 105 or UE 115 in the cellular network, can communicate simultaneously in uplink and downlink with two half-duplex panels using the same radio resources. Thus, a UE 115 (e.g., a vehicle in V2X communications) equipped with multiple TRPs that owns the capability of simultaneous transmission and reception using the same time-frequency radio resource may be referred to as a full-duplex capable UE. The UE 115 may also be capable of working in both the full-duplex mode and backing off to a half-duplex mode.

In the wireless communications system 100, a UE 115 or a base station 105, or both, may support half duplex communications or full duplex communications, or a combination thereof. For example, a UE 115 may operate in a half-duplex mode, in which the UE 115 may either receive downlink communications from a base station 105, or transmit uplink communication to the base station 105, during a TTI. Similarly, a base station 105 may operate in a half-duplex mode, in which the base station 105 may either transmit downlink communications to a UE 115, or receive uplink communication from the UE 115, during a TTI. In some cases, a UE 115 or a base station 105, or both, may experience self-interference when operating in a full duplex mode. In some examples, the self-interference may occur due to signal leakage between a transmit antenna and a receive antenna. In some examples, the self-interference may occur from a transmit antenna to a receive chain due to a proxy of a UE 115 or a base station 105, or both. In some other examples, the self-interference may occur from a transmit antenna to a receive chain due to one or more signal reflections as a result of local antenna clutter. In some cases, a self-interference from a transmit signal may be as strong as a receive signal with cancellation techniques (e.g., analog cancellation operations, digital cancellation operations, etc.).

A UE 115 or a base station 105, or both, when operating in a full duplex mode may use different BWPs to reduce a self-interference. That is, a UE 115 or a base station 105, or both, may use different BWPs for downlink communications and uplink communications. For example, a UE 115 may use one BWP for receiving downlink transmissions from a base station 105, and another BWP for transmitting uplink transmissions to the base station 105. Similarly, a base station 105 may use one BWP for transmitting downlink transmissions to a UE 115, and another BWP for receiving uplink transmissions from the UE 115. In some cases, reducing or mitigating self-interference may improve spectrum efficiency in the wireless communications system 100. In some other cases, reducing or mitigating self-interference may provide a higher reliability and a lower latency for wireless communications between a UE 115 and a base station 105, or between at least two UEs 115 (e.g., in D2D wireless communications), etc.

The wireless communications system 100 may, additionally or alternatively, support decreasing or eliminating self-interference based on beam pair selection. A base station 105 or a UE 115, or both, may reduce or mitigate self-interference based on selection of an uplink and downlink beam pair. For example, a base station 105 or a UE 115, or both, may select a transmit beam (e.g., a transmit uplink beam, a transmit downlink beam) and a receive beam (e.g. a receive uplink beam, a receive downlink beam) from different antenna panels or beams with different spatial directions and orientations, or the like. In some examples, a base station 105 or a UE 115, or both, may select uplink and downlink beam pairs based on a beam training procedure using simultaneous reference signal sweeping operations (e.g. CSI-RS, SRS, etc.). In a full duplex mode, a base station 105 or a UE 115, or both, may use two beam pair links for uplink and downlink balancing a signal strength in an intended link (e.g., uplink and downlink path loss balancing) and self-interference. For example, if an uplink beam changes then the UE 115 may also update a downlink beam.

In the wireless communications system 100, a UE 115 and a base station 105 (e.g., an eNB, a next-generation NodeB or a giga-NodeB, either of which may be referred to as a gNB, or some other base station), may support wireless communications over one or multiple radio access technologies. Examples of radio access technologies include 4G systems, such as LTE systems, and 5G systems, which may be referred to as NR systems. The base station 105 and the UE 115 may operate in a half-duplex mode or a full-duplex mode, or a combination thereof. The base station 105 and the UE 115 may also support techniques for adapting configurations for a semi-persistent transmission based on whether the semi-persistent transmission overlaps with a dynamic transmission.

A base station 105 may include a base station communications manager 102 that enables the base station 105 to determine whether a semi-persistent transmission overlaps in a time domain with a dynamic transmission and identify a configuration at a UE 115 used to transmit or receive the semi-persistent transmission based on the determining. A UE 115 may include a UE communications manager 101 that enables the UE 115 to determine whether a semi-persistent transmission overlaps in a time domain with a dynamic transmission and identify a configuration for transmitting or receiving the semi-persistent transmission based on the determining. Because the configuration at the UE 115 and the base station 105 for transmitting or receiving the semi-persistent transmission may be adapted based on whether the semi-persistent transmission overlaps with a dynamic transmission, the UE 115 and the base station 105 may be able to identify an optimal configuration for the semi-persistent transmission (e.g., to limit self-interference when appropriate and maximize throughput).

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Flow control feedback is one technique for increasing the likelihood that data is received correctly over a communication link 125. Flow control feedback may include an acknowledgment (ACK) indicating that a receiving device successfully decoded a transmission and a negative ACK (NACK) indicating that a receiving device failed to decode a transmission. An example of flow control feedback (i.e., feedback controlling the flow of communications between a base station 105 and a UE 115) is hybrid automatic repeat request (HARQ) feedback. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN)

architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for grant free transmissions in wireless communications as described herein. For example, some operations described as being performed by a UE 115 or a base station 105 may additionally or alternatively be performed by components of the disaggregated RAN architecture (e.g., IAB nodes, DUs, CUs, etc.).

Wireless communications system 100 may support grant-free transmissions and grant-based transmissions. Grant-free transmissions may correspond to transmissions on resources allocated semi-statically or statically by a base station 105. Grant-free transmissions may also be referred to as semi-static transmissions, semi-persistent transmissions, semi-persistent scheduling (SPS) transmissions, or configured grant transmissions. In some cases, a base station 105 may transmit RRC signaling (e.g., semi-static or static signaling) to allocate resources for the grant-free transmissions. A UE 115 or base station 105 may then transmit or receive grant-free transmissions on the resources without receiving a grant from the base station 105 (e.g., when the UE 115 or base station 105 has sufficient data to transmit). Grant-based transmissions may correspond to transmissions on resources allocated dynamically by a base station 105. Grant-based transmissions may also be referred to as dynamic transmissions. In some cases, a base station 105 may transmit a grant in downlink control information (DCI) in a physical downlink control channel (PDCCH) scheduling a grant-based transmission.

In some aspects, wireless communications system 100 may support full-duplex communications with semi-persistent transmissions and dynamic transmissions. For instance, a communications device (e.g., a UE 115 or base station 105) may simultaneously transmit a semi-persistent transmission and receive a dynamic transmission. Similarly, the communications device may simultaneously receive a semi-persistent transmission and transmit a dynamic transmission. Thus, in one use case of full-duplex, a semi-persistent transmission may be preconfigured in one link direction, and a base station 105 may still schedule a dynamic transmission in the other link direction at the same time as the semi-persistent transmission (e.g., whenever appropriate). In some cases, however, if the semi-persistent transmission is solely set up semi-statically or statically (e.g., in RRC), then a transmission configuration for the semi-persistent transmission may also be semi-statically or statically configured (e.g., in RRC). The transmission configuration may include a transmit beam for an uplink transmission of the semi-persistent transmission (e.g., a sounding reference signal (SRS) resource indication (SRI) corresponding to the transmit beam), a transmitted PMI (TPMI), a rank indication (RI), modulation and coding scheme (MCS), demodulation reference signal (DMRS) type, etc.

If the transmission configuration for a semi-persistent transmission is set semi-statically or statically by a base station 105, the base station 105 may be unaware of whether the semi-persistent transmission may overlap with another transmission in an opposite link direction. Thus, the configuration that is set for a communications device to use to transmit or receive the semi-persistent transmission may not be optimal. As an example, the configuration may be set for transmitting or receiving a semi-persistent transmission that does not overlap with another transmission, and a UE 115 may experience self-interference if the semi-persistent transmission overlaps with another transmission. As described herein, a UE 115 and a base station 105 in wireless communications system 100 may support efficient techniques for adapting a configuration for transmitting or receiving a semi-persistent transmission based on whether the semi-persistent transmission overlaps with another transmission.

Figure 2:
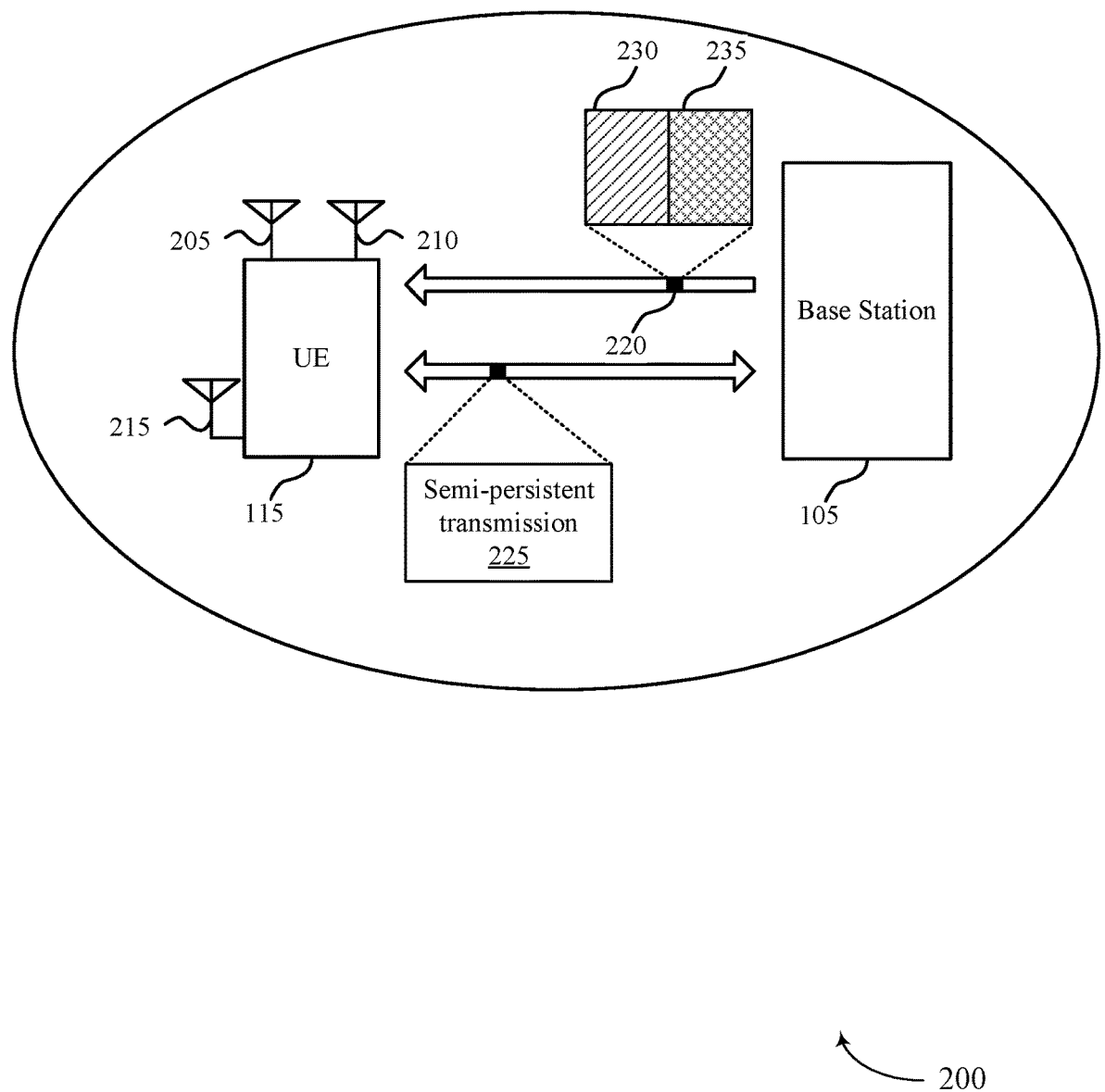
FIG. 2 illustrates an example of a wireless communications system that supports transmission configuration determination for grant-free transmissions in full-duplex systems in accordance with one or more aspects of the present disclosure.

FIG. 2 illustrates an example of a wireless communications system 200 that supports transmission configuration determination for grant-free transmissions in full-duplex systems in accordance with one or more aspects of the present disclosure. The wireless communications system 200 may implement aspects of the wireless communications system 100. For example, the wireless communications system 200 may include a base station 105 and a UE 115, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, MIMO communications, or beamforming, or any combination thereof. The antennas of the base station 105 and the UE 115 may be located within one or more antenna arrays or antenna panels, which may support MIMO operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming for communications with the UE 115. Likewise, the UE 115 may have one or more antenna arrays that may support various MIMO or beamforming operations. Additionally, or alternatively, an antenna panel may support radio frequency beamforming for a signal transmitted via one or more antenna ports. The base station 105 and the UE 115 may thus be configured to support directional communications (e.g., beamformed communications) using the multiple antennas.

The base station 105 or the UE 115, or both may operate in a half-duplex mode or a full-duplex mode, or a combination thereof. For example, in a half-duplex mode, the UE 115 may either transmit uplink communications or receive downlink communications during one or more TTIs. In the full duplex mode, the UE 115 may simultaneously transmit uplink communications and receive downlink communications during the one or more TTIs. A TTI may span one or more time resources (e.g., symbols, mini-slots, slot, etc.) and one or more frequency resources (e.g., subcarriers, carriers, etc.).

In the example of FIG. 2, when the base station 105 and the UE 115 are configured with multiple antenna panels, where one antenna panel may be dedicated for downlink communications and another antenna panel may be dedicated for uplink communications, the base station 105 and the UE 115 may experience self-interference. The self-interference may be a result of simultaneously using multiple antenna panels for uplink communications and downlink communications (e.g., in full duplex communications). In some examples, the self-interference may occur due to, for example, signal leakage between a transmit antenna 205 and a receive antenna 210. In some other examples, the self-interference may occur due to, for example, signal leakage between a transmit antenna 215 and the receive antenna 210, but this self-interference may be less compared to the self-interference between the transmit antenna 205 and the receive antenna 210.

Because self-interference may prevent full-duplex communications, it may be appropriate for a UE 115 to adapt a configuration used for full-duplex communications to minimize self-interference. In some cases, however, a base station may semi-statically allocate resources and set configurations for some transmissions. Such transmissions may be referred to as semi-persistent transmissions. In such cases, at the time of allocating the resources and setting the configurations, the base station may be unaware of whether the transmissions may overlap with other transmissions in an opposite link direction. That is, the base station may be unaware of whether a UE 115 may transmit or receive the semi-persistent transmissions in a full-duplex mode or half-duplex mode. Thus, the configuration set by the base station 105 for the UE 115 to use to transmit or receive the semi-persistent transmissions may not be optimal, which may be detrimental to communications in a wireless communications system.

As described herein, the UE 115 and the base station 105 in wireless communications system 200 may use (e.g., assume) different configurations for a semi-persistent transmission based on whether a transmission in the opposite direction is scheduled at a same time as the semi-persistent transmission (e.g., when the transmission in the opposite direction overlaps with the semi-persistent transmission). In the example of FIG. 2, the base station 105 may transmit control signaling 220 to the UE 115 allocating resources for one or more semi-persistent transmissions. If there are no transmissions in the opposite direction scheduled at the same time as a semi-persistent transmission 225 of the one or more semi-persistent transmissions, the UE 115 and the base station 105 may use a half-duplex (e.g., normal) configuration for the semi-persistent transmission 225 (e.g., indicated in the control signaling 220). Alternatively, if there is a transmission in the opposite direction scheduled at the same time as a semi-persistent transmission 225, the UE 115 and the base station 105 may use a different configuration to mitigate self-interference in a full-duplex mode.

In some cases, the base station 105 may indicate the different configurations for transmitting or receiving the semi-persistent transmission 225 in the control signaling 220. For instance, the base station 105 may transmit a full-duplex configuration and a half-duplex configuration in the control signaling 220. That is, as an illustrative example, the control signaling 220 may include or otherwise indicate a pair of configurations including a first configuration 230 (e.g., the half-duplex configuration or the full-duplex configuration) and a second configuration 235 (e.g., the half-duplex configuration or the full-duplex configuration). That is, in some examples, the first configuration 230 may be referred to as an indication of the first configuration 230 and the second configuration 235 may be referred to as an indication of the second configuration 235. The base station 105 and the UE 115 may then determine whether the semi-persistent transmission 225 overlaps with a dynamic transmission (e.g., based on whether the base station 105 transmits or the UE 115 receives DCI scheduling the dynamic transmission overlapping in a time domain with the semi-persistent transmission 225). If the base station 105 and the UE 115 determine that the semi-persistent transmission 225 fails to overlap with a dynamic transmission, the base station 105 and the UE 115 may use the half-duplex configuration indicated in the control signaling 220 to transmit or receive the semi-persistent transmission 225. Alternatively, if the base station 105 and the UE 115 determine that the semi-persistent transmission 225 overlaps with a dynamic transmission, the base station 105 and the UE 115 may use the full-duplex configuration indicated in the control signaling 220 to transmit or receive the semi-persistent transmission 225.

In other cases, the base station 105 may indicate a different configuration for transmitting or receiving the semi-persistent transmission 225 in DCI (e.g., grant) used to schedule a dynamic transmission overlapping with the semi-persistent transmission 225. The base station 105 and the UE 115 may then determine whether the semi-persistent transmission 225 overlaps with a dynamic transmission. If the base station 105 and the UE 115 determine that the semi-persistent transmission 225 fails to overlap with a dynamic transmission, the base station 105 and the UE 115 may use a configuration indicated in the control signaling 220 to transmit or receive the semi-persistent transmission 225. Alternatively, if the base station 105 and the UE 115 determine that the semi-persistent transmission 225 overlaps with a dynamic transmission, the base station 105 and the UE 115 may use a different configuration indicated in the DCI (e.g., grant) used to schedule the dynamic transmission to transmit or receive the semi-persistent transmission 225.

In one example, DCI used to schedule a downlink dynamic transmission overlapping with an uplink semi-persistent transmission may indicate a receive beam for the UE 115 to use to receive the downlink dynamic transmission (e.g., by indicating a transmission configuration indication (TCI) state that corresponds to the receive beam at the UE 115). Then, the UE 115 may select a transmit beam for transmitting the semi-persistent transmission based on the receive beam used to receive the dynamic transmission. In some cases, the DCI may indicate an index of a pair of downlink and uplink beams corresponding to the receive beam to be used by the UE 115 to receive the downlink dynamic transmission and the transmit beam to be used by the UE 115 to transmit the uplink semi-persistent transmission. In other cases, the DCI may indicate the receive beam to be used by the UE 115 to receive the downlink dynamic transmission, and the UE 115 may use a transmit beam paired with the receive beam to transmit the uplink semi-persistent transmission. In such cases, different pairings between receive beams and transmit beams may be preconfigured.

Additionally, or alternatively, the UE 115 may identify a transmit configuration for transmitting the uplink semi-persistent transmission based on predefined rules. For instance, a full-duplex MCS may be fixed to be quadrature phase-shift keying (QPSK) or always a certain number (e.g., X) levels lower than a normal MCS. That is, a full-duplex configuration used for transmitting or receiving the semi-persistent transmission 225 when the semi-persistent transmission 225 overlaps with a dynamic transmission in an opposite link direction may be fixed or have a fixed relationship with a half-duplex configuration (e.g., normal configuration) indicated in the control signaling 220. Using the techniques described above, the UE 115 may use a different configuration to transmit or receive the semi-persistent transmission 225 depending on whether the semi-persistent transmission 225 may be full-duplexed. Thus, when in a full-duplex mode, the UE 115 may select a suitable beam pair for transmitting and receiving transmissions to minimize self-interference (e.g., where a beam in the beam pair used to transmit or receive the semi-persistent transmission 225 in the full-duplex mode may be different from a beam used to transmit or receive the semi-persistent transmission 225 in a half-duplex mode).

Figure 3:
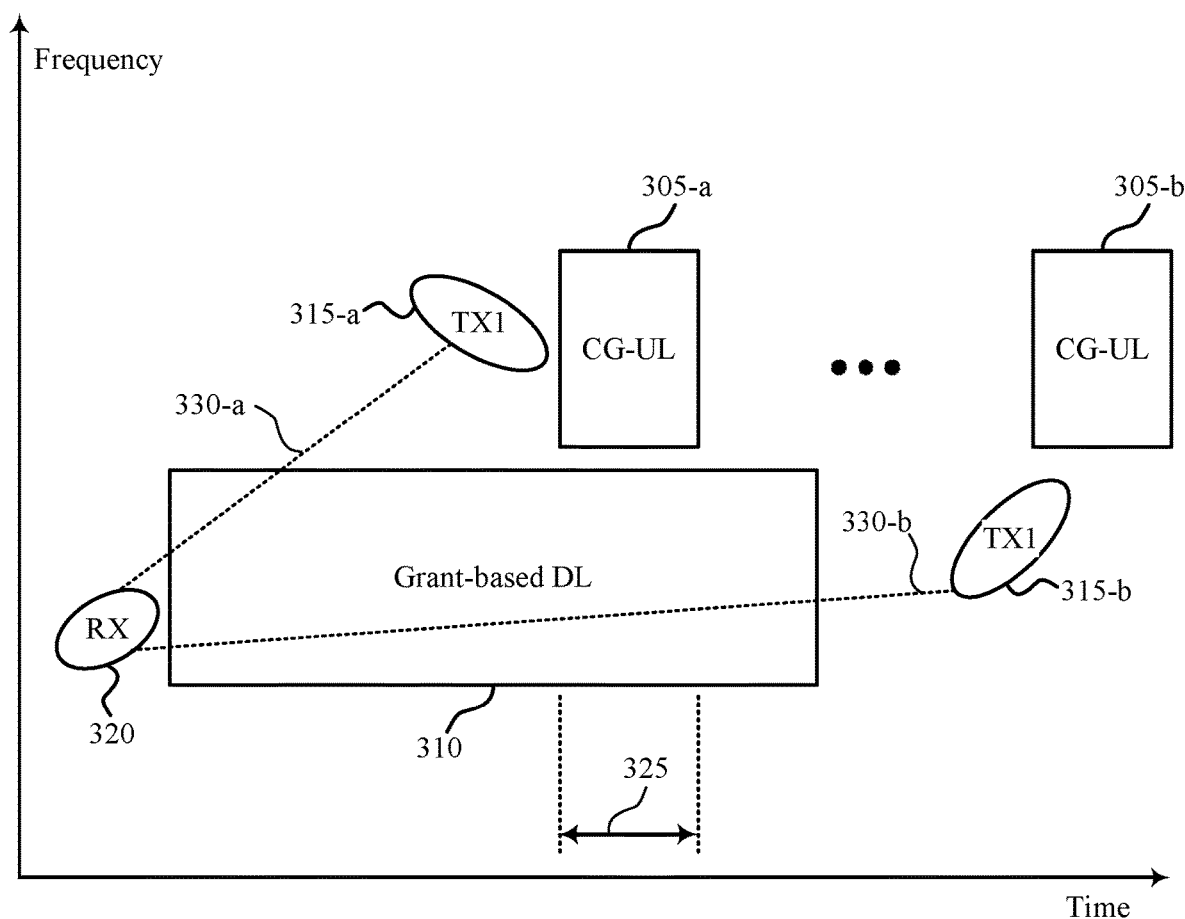
FIG. 3 illustrates an example of different configurations used by a user equipment (UE) for semi-persistent transmissions in accordance with one or more aspects of the present disclosure.

FIG. 3 illustrates an example of different configurations 300 used by a UE 115 for semi-persistent transmissions in accordance with one or more aspects of the present disclosure. In one example, the UE 115 may determine that a semi-persistent transmission 305-a (e.g., configured grant uplink (CG-UL) transmission) overlaps with a dynamic transmission 310 (e.g., grant-based downlink transmission to the UE 115), as illustrated by the overlap 325 (e.g., an overlap in the time domain between a semi-persistent transmission and a dynamic transmission). As such, the UE 115 may use a first transmit beam 315-a for transmitting the semi-persistent transmission 305-a. The UE 115 may select the first transmit beam 315-a such that there is minimal self-interference between the semi-persistent transmission 305-a transmitted using the first transmit beam 315-a and the dynamic transmission 310 received on the receive beam 320. For example, the UE 115 may identify a pairing 330-a between the receive beam 320 and the transmit beam 315-a as described herein (e.g., the pairing may be predefined, indicated by control signaling, etc.). In another example, the UE 115 may determine that a semi-persistent transmission 305-b (e.g., another CG-UL transmission) fails to overlap with a dynamic transmission. As such, the UE 115 may use a second transmit beam 315-*b* for transmitting the semi-persistent transmission 305-*b*. The UE 115 may select the second transmit beam 315-*b* to maximize throughput without having to consider self-interference at the UE 115. For example, the UE 115 may identify a pairing 330-*b* between the receive beam 320 and the second transmit beam 315-*b*.

Figure 4:
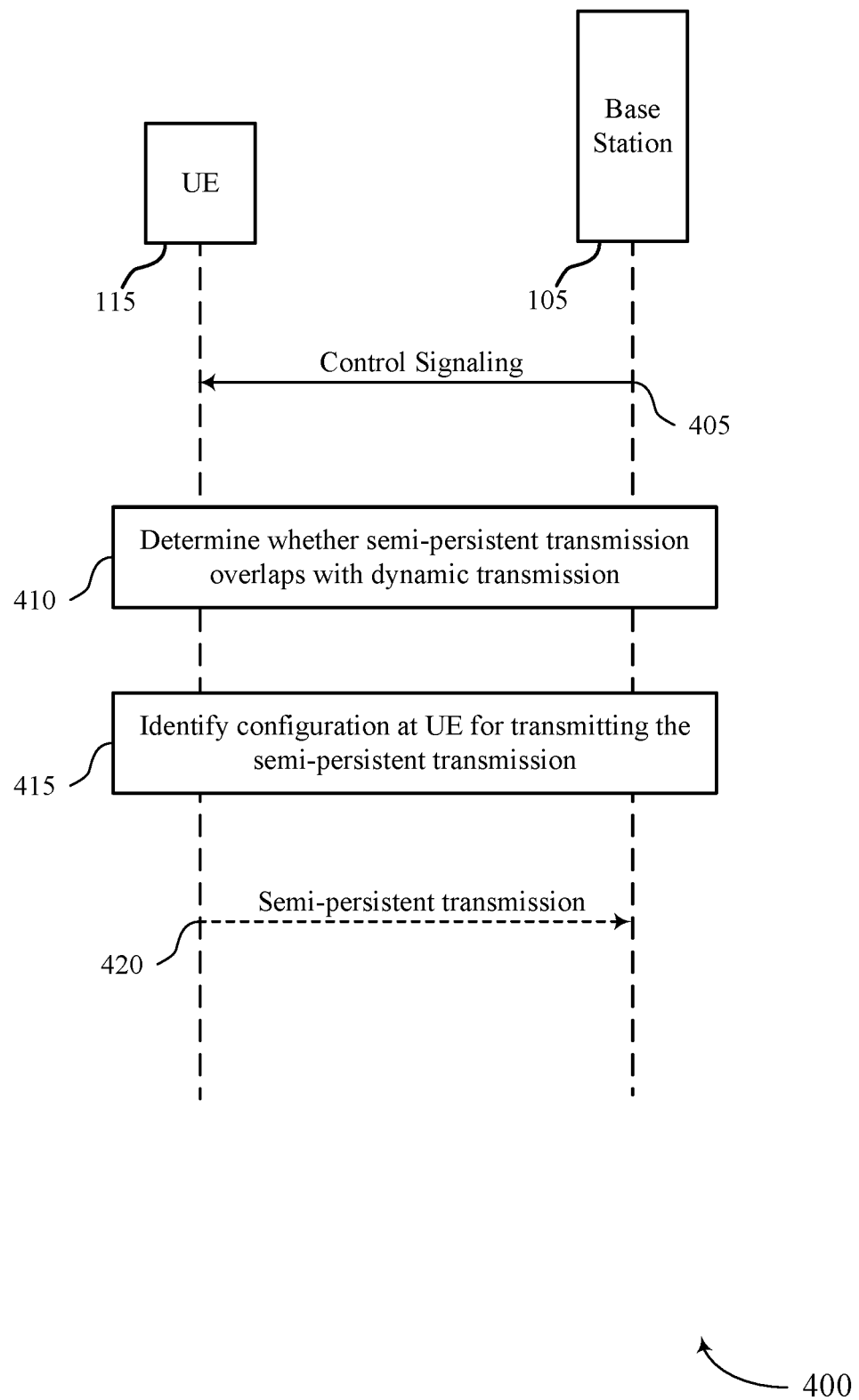
FIG. 4 illustrates an example of a process flow that supports transmission configuration determination for grant-free transmissions in full-duplex systems in accordance with one or more aspects of the present disclosure.

FIG. 4 illustrates an example of a process flow 400 that supports transmission configuration determination for grant-free transmissions in full-duplex systems in accordance with one or more aspects of the present disclosure. The process flow 400 may implement aspects of the wireless communications system 100 and the wireless communications system 200 described with reference to FIGS. 1 and 2, respectively. In the example of FIG. 4, a UE 115 may operate in a half-duplex mode or a full-duplex mode, or a combination thereof. The process flow 400 may be based on a configuration by a base station 105 and implemented by a UE 115 to promote power saving for the UE 115 when operating in a full-duplex mode. The process flow 400 may also be based on a configuration by the base station 105 and implemented by the UE 115 to promote high reliability and low latency wireless communications, among other benefits.

In the following description of the process flow 400, the operations between the base station 105 and the UE 115 may be transmitted in a different order than the example order shown, or the operations performed by the base station 105 and the UE 115 may be performed in different orders or at different times. Some operations may also be omitted from the process flow 400, and other operations may be added to the process flow 400. The base station 105 and the UE 115 may be examples of a base station 105 and a UE 115 as described with reference to FIGS. 1 and 2, respectively.

At 405, the base station 105 may transmit control signaling to the UE 115 allocating resources for one or more uplink semi-persistent transmissions. At 410, the UE 115 and the base station 105 may determine whether an uplink semi-persistent transmission of the one or more uplink semi-persistent transmissions overlaps in a time domain with a downlink dynamic transmission. At 415, the UE 115 may then identify a configuration for transmitting the uplink semi-persistent transmission based on whether the uplink semi-persistent transmission overlaps in a time domain with the downlink dynamic transmission. Similarly, the base station 105 may identify the configuration used by the UE for transmitting the uplink semi-persistent transmission based on whether the uplink semi-persistent transmission overlaps in a time domain with the downlink dynamic transmission. The UE 115 may then transmit the uplink semi-persistent transmission using the identified configuration, and the base station 105 may receive the uplink semi-persistent transmission using a complementary configuration to the identified configuration.

Although FIG. 4 illustrates techniques for identifying a suitable configuration for an uplink semi-persistent transmission and a downlink dynamic transmission, the techniques described herein may also be used to identify a suitable configuration for a downlink semi-persistent transmission and an uplink dynamic transmission. For instance, the base station 105 may transmit control signaling to the UE 115 allocating resources for one or more downlink semi-persistent transmissions. The UE 115 and the base station 105 may determine whether a downlink semi-persistent transmission of the one or more downlink semi-persistent transmissions overlaps in a time domain with an uplink dynamic transmission. The UE 115 may then identify a configuration for receiving the downlink semi-persistent transmission based on whether the downlink semi-persistent transmission overlaps in a time domain with the uplink dynamic transmission. Similarly, the base station 105 may identify the configuration used by the UE for receiving the downlink semi-persistent transmission based on whether the downlink semi-persistent transmission overlaps in a time domain with the uplink dynamic transmission. The UE 115 may then receive the downlink semi-persistent transmission using the identified configuration, and the base station 105 may transmit the downlink semi-persistent transmission using a complementary configuration to the identified configuration.

In the examples described above, a configuration at the UE 115 may be adapted based on whether the UE 115 is performing full-duplex communications or half-duplex communications. Specifically, the configuration at the UE 115 used to transmit or receive a semi-persistent transmission may depend on whether the semi-persistent transmission overlaps in a time domain with a dynamic transmission. If the semi-persistent transmission overlaps in the time domain with the dynamic transmission, the configuration at the UE 115 used to transmit or receive a semi-persistent transmission may minimize self-interference between the semi-persistent transmission and the dynamic transmission. If the semi-persistent transmission fails to overlap in the time domain with the dynamic transmission (e.g., no dynamic transmission overlaps with the semi-persistent transmission), the configuration at the UE 115 used to transmit or receive the semi-persistent transmission may maximize throughput without considering self-interference.

In some examples, the configuration at the UE 115 used to transmit the semi-persistent transmission may specify a transmit beam for the UE 115 to use to transmit the semi-persistent transmission. In such examples, the complementary configuration at the base station 105 used to receive the semi-persistent transmission may specify a best receive beam for receiving signals transmitted by the UE 115 on the transmit beam used to transmit the semi-persistent transmission. The base station 105 may identify the best receive beam based at least in part on a beam management procedure. As part of the beam management procedure, the UE 115 may transmit reference signals on the transmit beam used to transmit the semi-persistent transmission. The base station 105 may receive the reference signals on one or more receive beams, and the base station 105 may perform measurements on the reference signals received on the one or more receive beams. The base station 105 may then identify the best receive beam as the receive beam of the one or more receive beams associated with the best measurements (e.g., highest reference signal received power (RSRP), highest reference signal received quality (RSRQ), or highest signal-to-interference-plus-noise ratio (SINR)).

In other examples, the configuration at the UE 115 used to transmit the semi-persistent transmission may specify a receive beam for the UE 115 to use to receive the semi-persistent transmission. In such examples, the complementary configuration at the base station 105 used to transmit the semi-persistent transmission may specify a best transmit beam for transmitting signals to be received by the UE 115 on the receive beam used to receive the semi-persistent transmission. The base station 105 may identify the best transmit beam based at least in part on a beam management procedure. As part of the beam management procedure, the base station 105 may transmit reference signals on one or more transmit beams to the UE 115. The UE 115 may receive the reference signals on the receive beam used to receive the semi-persistent transmission, and the UE 115 may perform measurements on the reference signals transmitted on the one or more transmit beams. The UE 115 may then signal, to the base station, the best transmit beam of the one or more transmit beams, where the best transmit beam is associated with the best measurements (e.g., highest RSRP, RSRQ, or SINR).

In yet other examples, the configuration at the UE 115 used to transmit or receive the semi-persistent transmission may specify an MCS, PMI, RI, etc. used to transmit or receive the semi-persistent transmission. In such examples, the complementary configuration at the base station 105 used to transmit or receive the semi-persistent transmission may also specify the same MCS, PMI, RI, etc. used by the UE 115 to transmit or receive the semi-persistent transmission. Accordingly, a receiving device may identify the MCS, PMI, RI, etc. used by a transmitting device to transmit the semi-persistent transmission, and the receiving device may be able to successfully decode the semi-persistent transmission.

Figure 5:
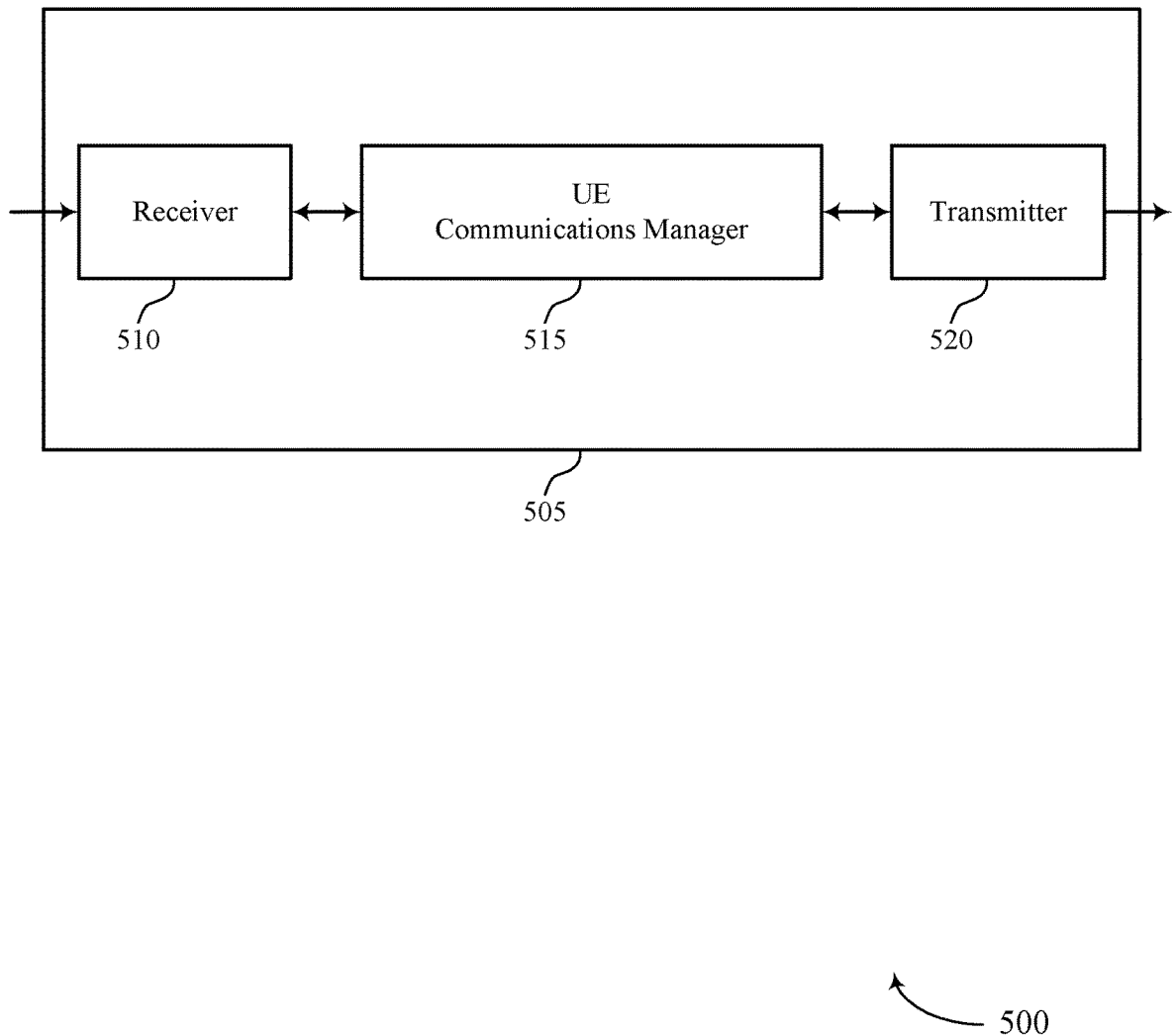
FIGS. 5 and 6 show block diagrams of devices that support transmission configuration determination for grant-free transmissions in full-duplex systems in accordance with one or more aspects of the present disclosure.

FIG. 5 shows a block diagram 500 of a device 505 that supports transmission configuration determination for grant-free transmissions in full-duplex systems in accordance with one or more aspects of the present disclosure. The device 505 may be an example of aspects of a UE 115 as described herein. In some examples, the device 505 may be referred to as a first device (e.g., a UE, a DU, a child node, etc.). The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to transmission configuration determination for grant-free transmissions in full-duplex systems, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may be implemented as an integrated circuit or chipset for the device 505, and the receiver 510 and the transmitter 520 may be implemented as analog components (for example, amplifiers, filters, antennas) coupled with the device 505 modem to enable wireless transmission and reception. The actions performed by the UE communications manager 515 as described herein may be implemented to enable the UE communications manager 515 to support full-duplex communications with limited self-interference while the device 505 is operating in a full-duplex mode.

For example, the UE communications manager 515 may receive control signaling allocating resources to the UE for one or more semi-persistent transmissions in a first link direction, the first link direction comprising an uplink or a downlink, determine whether a semi-persistent transmission of the one or more semi-persistent transmissions overlaps in a time domain with a dynamic transmission in a second link direction, the second link direction being different from the first link direction, identify a configuration for transmitting or receiving the semi-persistent transmission based at least in part on the determining, and transmit or receive the semi-persistent transmission using the identified configuration. By identifying the configuration based on whether the semi-persistent transmission overlaps in a time domain with a dynamic transmission, one or more processors of the device 505 (for example, processor(s) controlling or incorporated with the UE communications manager 515) may experience power savings (e.g., increased battery life) since the UE may successfully transmit or receive the semi-persistent transmission and the dynamic transmission with limited self-interference, and the UE may not have to continue to transmit or receive retransmissions of the semi-persistent transmission.

In some examples, the UE communications manager 515 may receive control signaling allocating resources to the first device for one or more semi-persistent transmissions in a first link direction. The UE communications manager 515 may communicate a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

The UE communications manager 515 may be an example of means for performing various aspects of managing flow control feedback for full-duplex communications as described herein. The UE communications manager 515, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure. In some examples, the UE communications manager 515 may be configured to perform various operations (e.g., receiving, determining, transmitting) using or otherwise in cooperation with the receiver 510, the transmitter 520, or both.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
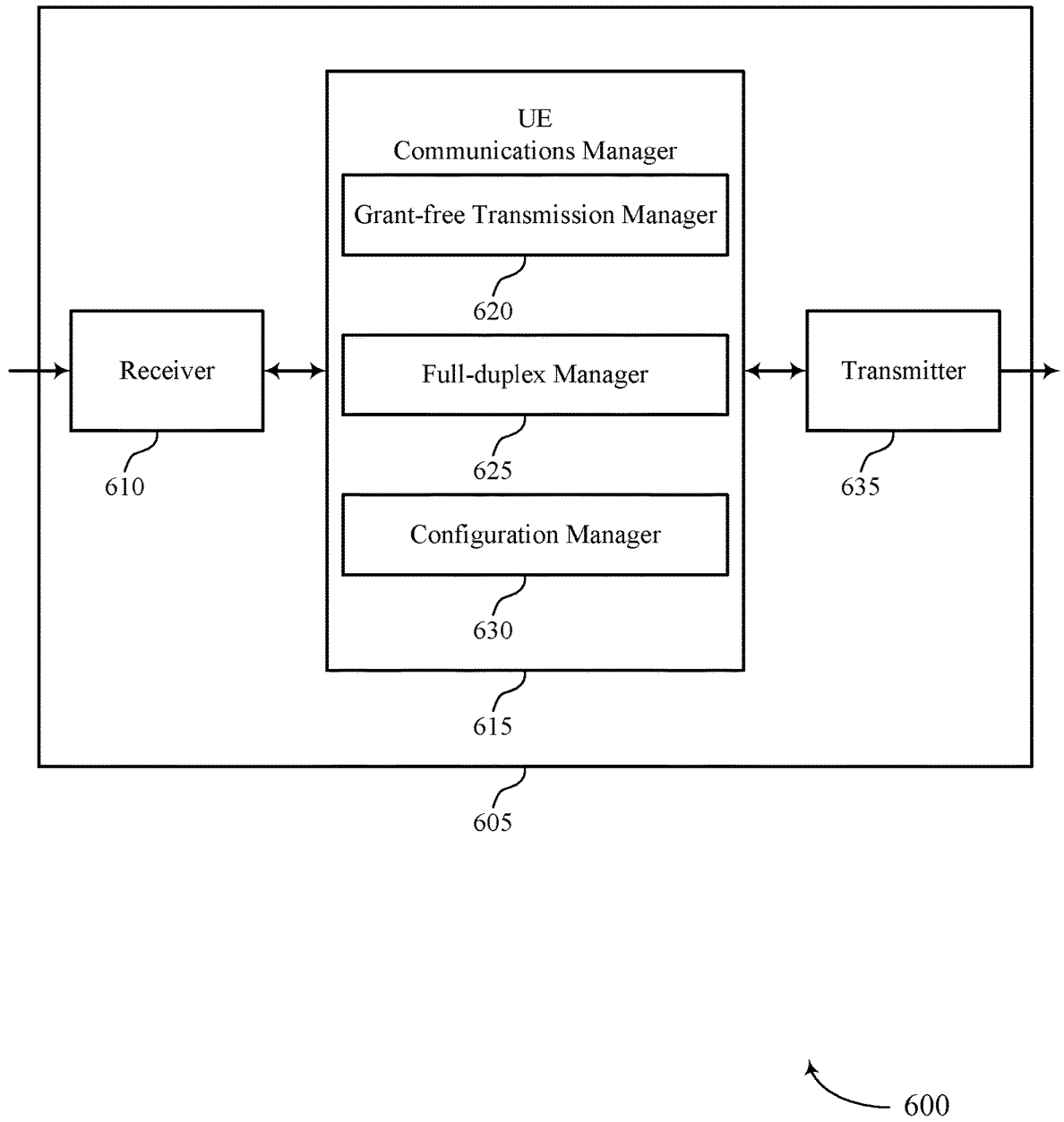

FIG. 6 shows a block diagram 600 of a device 605 that supports transmission configuration determination for grant-free transmissions in full-duplex systems in accordance with one or more aspects of the present disclosure. The device 605 may be an example of aspects of a device 505, or a UE 115 as described herein. In some examples, the device 605 may be referred to as a first device (e.g., a UE, a DU, a child node, etc.). The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to transmission configuration determination for grant-free transmissions in full-duplex systems, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a grant-free transmission manager 620, a full-duplex manager 625, and a configuration manager 630. The UE communications manager 615 may be an example of aspects of the UE communications manager 810 described herein.

The grant-free transmission manager 620 may receive control signaling allocating resources to the UE for one or more semi-persistent transmissions in a first link direction, the first link direction including an uplink or a downlink. The full-duplex manager 625 may determine whether a semi-persistent transmission of the one or more semi-persistent transmissions overlaps in a time domain with a dynamic transmission in a second link direction, the second link direction being different from the first link direction. The configuration manager 630 may identify a configuration for transmitting or receiving the semi-persistent transmission based on the determining. The grant-free transmission manager 620 may transmit or receive the semi-persistent transmission using the identified configuration.

In some examples, the grant-free transmission manager 620 may receive control signaling allocating resources to the first device for one or more semi-persistent transmissions in a first link direction. The grant-free transmission manager 620 may communicate a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
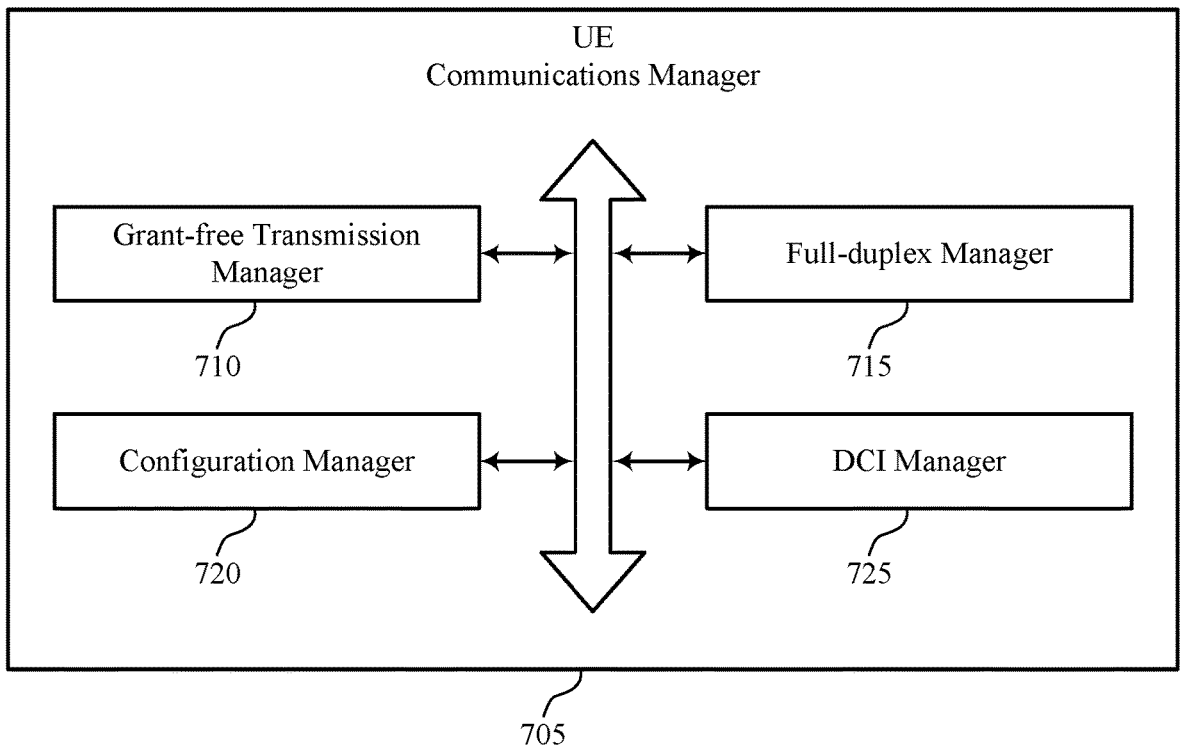
FIG. 7 shows a block diagram of a communications manager that supports transmission configuration determination for grant-free transmissions in full-duplex systems in accordance with one or more aspects of the present disclosure.

FIG. 7 shows a block diagram 700 of a UE communications manager 705 that supports transmission configuration determination for grant-free transmissions in full-duplex systems in accordance with one or more aspects of the present disclosure. The UE communications manager 705 may be an example of aspects of a UE communications manager 515, a UE communications manager 615, or a UE communications manager 810 described herein. The UE communications manager 705 may include a grant-free transmission manager 710, a full-duplex manager 715, a configuration manager 720, and a DCI manager 725. Each of these modules may communicate, directly or indirectly, with one another (e.g., via one or more buses).

The grant-free transmission manager 710 may receive control signaling allocating resources to the UE for one or more semi-persistent transmissions in a first link direction, the first link direction including an uplink or a downlink. The full-duplex manager 715 may determine whether a semi-persistent transmission of the one or more semi-persistent transmissions overlaps in a time domain with a dynamic transmission in a second link direction, the second link direction being different from the first link direction. The configuration manager 720 may identify a configuration for transmitting or receiving the semi-persistent transmission based on the determining. The grant-free transmission manager 710 may transmit or receive the semi-persistent transmission using the identified configuration.

In some examples, the configuration manager 720 may receive, in the control signaling, a full-duplex configuration and a half-duplex configuration for transmitting or receiving the semi-persistent transmission. The configuration manager 720 may then identify the full-duplex configuration or the half-duplex configuration for transmitting or receiving the semi-persistent transmission based at least in part on the determining.

In some examples, the configuration manager 720 may identify the full-duplex configuration for transmitting or receiving the semi-persistent transmission if the semi-persistent transmission in the first link direction overlaps in the time domain with the dynamic transmission in the second link direction. In some examples, the configuration manager 720 may identify the half-duplex configuration for transmitting or receiving the semi-persistent transmission if the semi-persistent transmission in the first link direction fails to overlap in the time domain with the dynamic transmission in the second link direction. In some cases, the full-duplex configuration and the half-duplex configuration include different beams, different modulation and coding schemes, different precoding matrix indicators, different rank indicators, or a combination thereof.

The DCI manager 725 may receive downlink control information scheduling the dynamic transmission in the second link direction. The full-duplex manager 715 may determine that the semi-persistent transmission overlaps in the time domain with the dynamic transmission based at least in part on receiving the downlink control information.

In some examples, the DCI manager 725 may receive, in the downlink control information, an indication of a pair of configurations including a first configuration for transmitting or receiving the dynamic transmission in the second link direction and a second configuration for transmitting or receiving the semi-persistent transmission in the first link direction. The configuration manager 720 may identify the second configuration for transmitting or receiving the semi-persistent transmission based at least in part on receiving the indication of the pair of configurations in the downlink control information. In some examples, the DCI manager 725 may receive, in the downlink control information, an indication of a first configuration for transmitting or receiving the dynamic transmission in the second link direction. The configuration manager 720 may identify a second configuration for transmitting or receiving the semi-persistent transmission based at least in part on the first configuration indicated in the downlink control information.

In some cases, the first configuration and the second configuration include different beams, different modulation and coding schemes, different precoding matrix indicators, different rank indicators, or a combination thereof. In some cases, a pairing between a first beam in the first configuration and a second beam in the second configuration is predefined. In some cases, a relationship between the first configuration and the second configuration is predefined. In some cases, the downlink control information schedules the dynamic transmission in the second link direction to the UE. In some cases, the first link direction includes uplink and the second link direction includes downlink, or the first link direction includes downlink and the second link direction includes uplink.

In some examples, the grant-free transmission manager 710 may receive control signaling allocating resources to the first device for one or more semi-persistent transmissions in a first link direction. In some examples, the grant-free transmission manager 710 may communicate a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

In some examples, the configuration manager 720 may receive, in the control signaling, a full-duplex configuration and a half-duplex configuration for communicating the semi-persistent transmission.

In some examples, the configuration manager 720 may identify the full-duplex configuration for communicating the semi-persistent transmission based at least in part on the semi-persistent transmission in the first link direction overlapping in the time domain with the dynamic transmission in the second link direction. In some examples, the configuration manager 720 may identify the half-duplex configuration for communicating the semi-persistent transmission based at least in part on the semi-persistent transmission in the first link direction failing to overlap in the time domain with the dynamic transmission in the second link direction.

In some examples, the full-duplex configuration and the half-duplex configuration include different beams, different modulation and coding schemes, different precoding matrix indicators, different rank indicators, or a combination thereof.

In some examples, the DCI manager 725 may receive downlink control information scheduling the dynamic transmission in the second link direction. In some examples, the configuration manager 720 may determine that the semi-persistent transmission overlaps in the time domain with the dynamic transmission based on receiving the downlink control information.

In some examples, the DCI manager 725 may receive, in the downlink control information, an indication of a pair of configurations including a first configuration for communicating the dynamic transmission in the second link direction and a second configuration for communicating the semi-persistent transmission in the first link direction. In some examples, the configuration manager 720 may identify the second configuration for communicating the semi-persistent transmission based on receiving the indication of the pair of configurations in the downlink control information.

In some examples, the first configuration and the second configuration include different beams, different modulation and coding schemes, different precoding matrix indicators, different rank indicators, or a combination thereof.

In some examples, the DCI manager 725 may receive, in the downlink control information, an indication of a first configuration for communicating the dynamic transmission in the second link direction. In some examples, the configuration manager 720 may identify a second configuration for communicating the semi-persistent transmission based on the first configuration indicated in the downlink control information.

In some examples, the first configuration and the second configuration include different beams, different modulation and coding schemes, different precoding matrix indicators, different rank indicators, or a combination thereof. In some examples, a pairing between a first beam in the first configuration and a second beam in the second configuration is predefined, a relationship between the first configuration and the second configuration is predefined, or a combination thereof.

In some examples, the downlink control information schedules the dynamic transmission in the second link direction to the first device.

In some examples, the first link direction includes uplink and the second link direction includes downlink, the semi-persistent transmission including a configured grant transmission. In some examples, the first link direction includes downlink and the second link direction includes uplink, the semi-persistent transmission including a semi-persistent scheduling transmission.

In some examples, the first device includes a user equipment or a distributed unit. In some examples, the second device includes a base station or a centralized unit.

Figure 8:
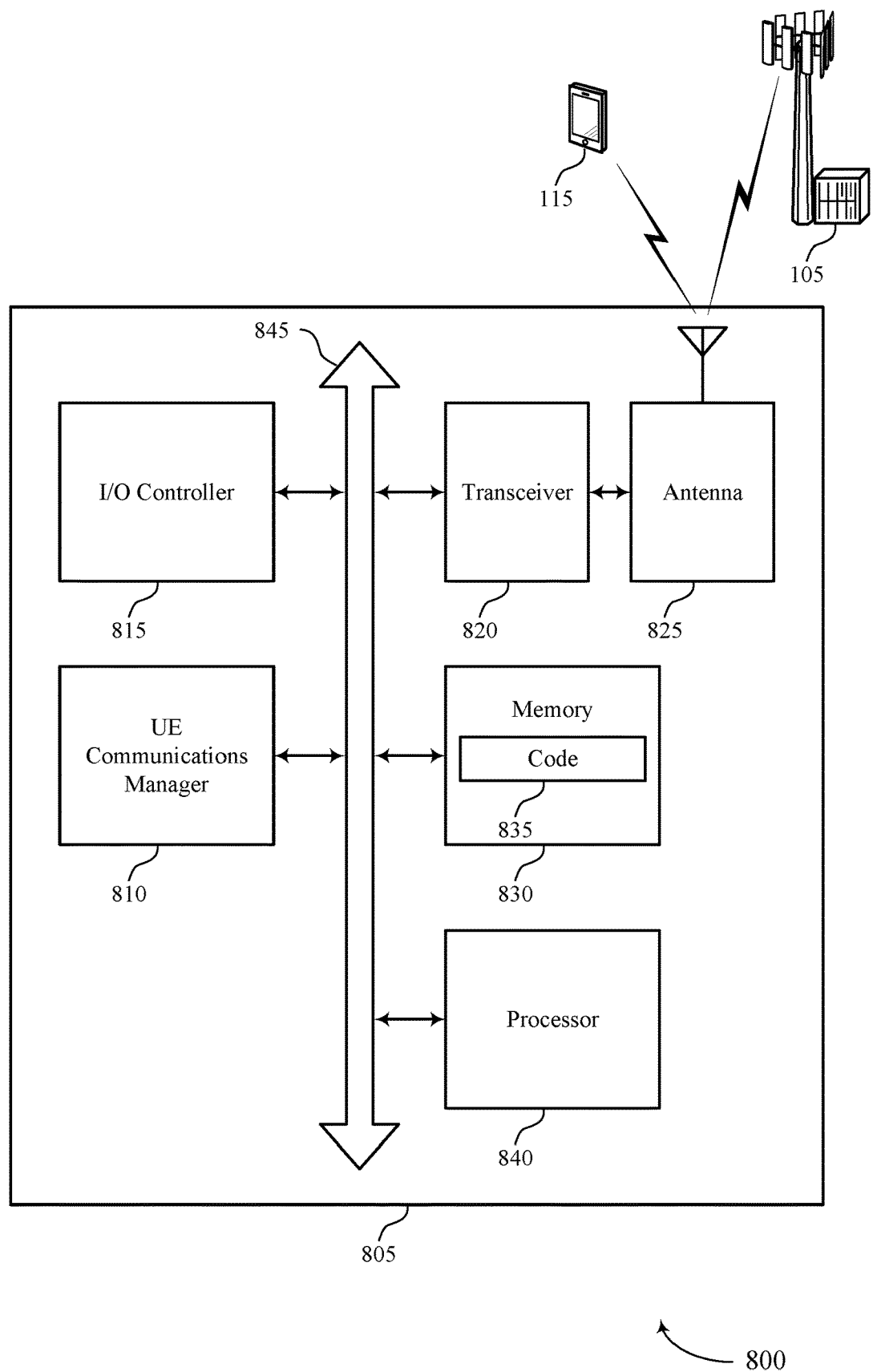
FIG. 8 shows a diagram of a system including a device that supports transmission configuration determination for grant-free transmissions in full-duplex systems in accordance with one or more aspects of the present disclosure.

FIG. 8 shows a diagram of a system 800 including a device 805 that supports transmission configuration determination for grant-free transmissions in full-duplex systems in accordance with one or more aspects of the present disclosure. The device 805 may be an example of or include the components of device 505, device 605, or a UE 115 as described herein. In some examples, the device 805 may be referred to as a first device (e.g., a UE, a DU, a child node, etc.). The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845). Although described in some aspects as a UE communications manager, any UE communications manager herein may be referred to as a first device communications manager (e.g., a communications manager of a UE, DU, a child node, etc.). Likewise, although described in some aspects as a base station communications manager, any base station communications manager herein may be referred to as a second device communications manager (e.g., a communications manager of a base station, CUE, parent node, etc.).

At least one implementation may enable the UE communications manager 810 to support full-duplex communications with limited self-interference. For example, the UE communications manager 810 may receive control signaling allocating resources to the UE for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration for transmitting or receiving the semi-persistent transmission based on the determining, and transmit or receive the semi-persistent transmission using the identified configuration. By identifying the configuration based on whether the semi-persistent transmission overlaps in a time domain with a dynamic transmission, one or more processors of the device 505 (for example, processor(s) controlling or incorporated with the UE communications manager 515) may experience power savings (e.g., increased battery life) since the UE may successfully transmit or receive the semi-persistent transmission and the dynamic transmission with limited self-interference, and the UE may not have to continue to transmit or receive retransmissions of the semi-persistent transmission.

In some examples, the UE communications manager 810 may receive control signaling allocating resources to the first device for one or more semi-persistent transmissions in a first link direction. The UE communications manager 810 may communicate a semi-persistent transmission in a first link direction using a configuration that is based on whether the semi-persistent transmission of one or more semi-persistent transmissions overlaps in a time domain with a dynamic transmission in a second link direction, the second link direction being different from the first link direction.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices. The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting transmission configuration determination for grant-free transmissions in full-duplex systems).

Figure 9:
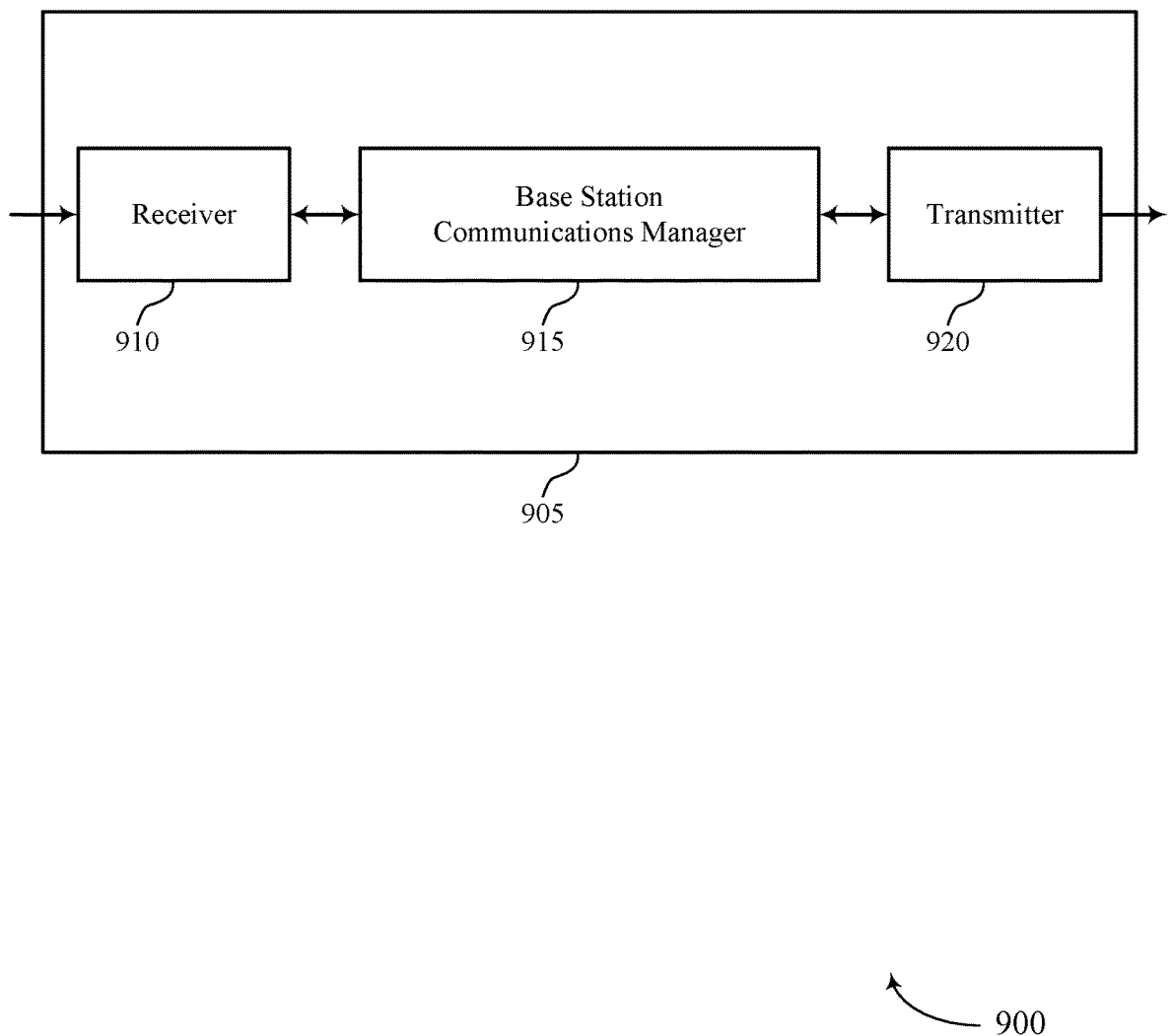
FIGS. 9 and 10 show block diagrams of devices that support transmission configuration determination for grant-free transmissions in full-duplex systems in accordance with one or more aspects of the present disclosure.

FIG. 9 shows a block diagram 900 of a device 905 that supports transmission configuration determination for grant-free transmissions in full-duplex systems in accordance with one or more aspects of the present disclosure. The device 905 may be an example of aspects of a base station 105 as described herein. In some examples, the device 905 may be referred to as a second device (e.g., a base station, a CU, a parent node, etc.). The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to transmission configuration determination for grant-free transmissions in full-duplex systems, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, control signaling allocating resources for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration to be used by the UE to transmit or receive the semi-persistent transmission based on the determining, and transmit or receive the semi-persistent transmission using a complementary configuration to the identified configuration. The base station communications manager 915 may be an example of aspects of the base station communications manager 1210 described herein.

In some examples, the base station communications manager 915 may transmit, to a first device, control signaling allocating resources for one or more semi-persistent transmissions in a first link direction. The base station communications manager 915 may communicate a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
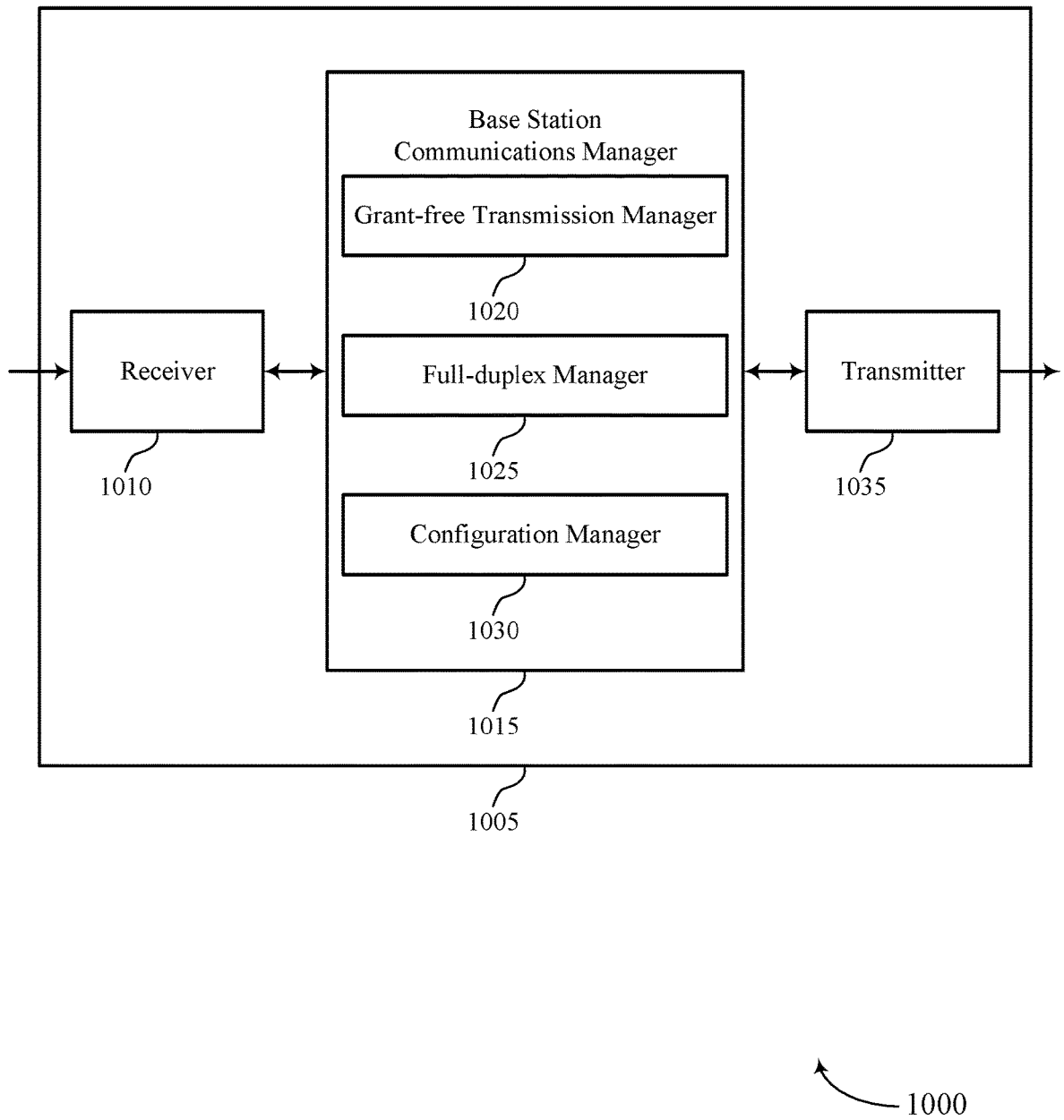

FIG. 10 shows a block diagram 1000 of a device 1005 that supports transmission configuration determination for grant-free transmissions in full-duplex systems in accordance with one or more aspects of the present disclosure. The device 1005 may be an example of aspects of a device 905, or a base station 105 as described herein. In some examples, the device 1005 may be referred to as a second device (e.g., a base station, a CU, a parent node, etc.). The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to transmission configuration determination for grant-free transmissions in full-duplex systems, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a grant-free transmission manager 1020, a full-duplex manager 1025, and a configuration manager 1030. The base station communications manager 1015 may be an example of aspects of the base station communications manager 1210 described herein.

The grant-free transmission manager 1020 may transmit, to a UE, control signaling allocating resources for one or more semi-persistent transmissions in a first link direction, the first link direction including an uplink or a downlink. The full-duplex manager 1025 may determine whether a semi-persistent transmission of the one or more semi-persistent transmissions overlaps in a time domain with a dynamic transmission in a second link direction, the second link direction being different from the first link direction. The configuration manager 1030 may identify a configuration to be used by the UE to transmit or receive the semi-persistent transmission based on the determining. The grant-free transmission manager 1020 may transmit or receive the semi-persistent transmission using a complementary configuration to the identified configuration.

In some examples, the grant-free transmission manager 1020 may transmit, to a first device, control signaling allocating resources for one or more semi-persistent transmissions in a first link direction. The grant-free transmission manager 1020 may communicate a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
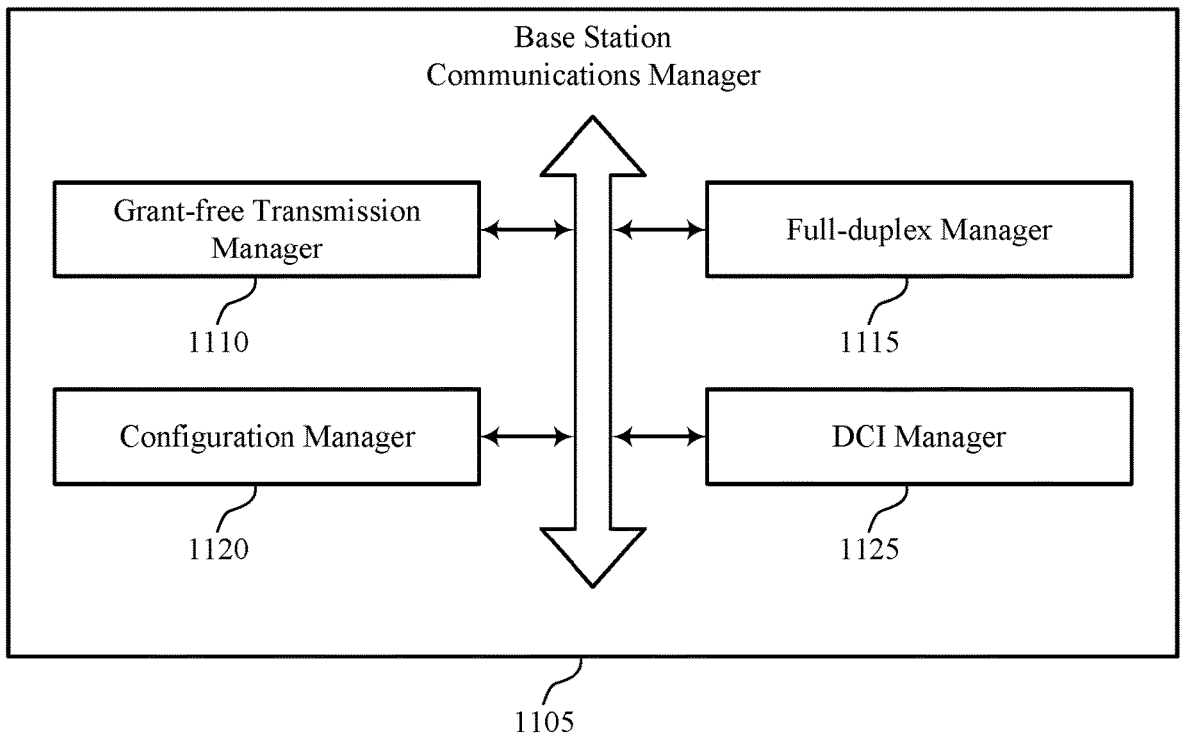
FIG. 11 shows a block diagram of a communications manager that supports transmission configuration determination for grant-free transmissions in full-duplex systems in accordance with one or more aspects of the present disclosure.

FIG. 11 shows a block diagram 1100 of a base station communications manager 1105 that supports transmission configuration determination for grant-free transmissions in full-duplex systems in accordance with one or more aspects of the present disclosure. The base station communications manager 1105 may be an example of aspects of a base station communications manager 915, a base station communications manager 1015, or a base station communications manager 1210 described herein. The base station communications manager 1105 may include a grant-free transmission manager 1110, a full-duplex manager 1115, a configuration manager 1120, and a DCI manager 1125. Each of these modules may communicate, directly or indirectly, with one another (e.g., via one or more buses).

The grant-free transmission manager 1110 may transmit, to a UE, control signaling allocating resources for one or more semi-persistent transmissions in a first link direction, the first link direction including an uplink or a downlink. The full-duplex manager 1115 may determine whether a semi-persistent transmission of the one or more semi-persistent transmissions overlaps in a time domain with a dynamic transmission in a second link direction, the second link direction being different from the first link direction. The configuration manager 1120 may identify a configuration to be used by the UE to transmit or receive the semi-persistent transmission based on the determining. The grant-free transmission manager 1110 may transmit or receive the semi-persistent transmission using a complementary configuration to the identified configuration.

In some examples, the configuration manager 1120 may transmit, in the control signaling, a full-duplex configuration and a half-duplex configuration for the UE to use to transmit or receive the semi-persistent transmission. The configuration manager 1120 may identify that the UE is to use the full-duplex configuration or the half-duplex configuration to transmit or receive the semi-persistent transmission based at least in part on the determining.

In some examples, the configuration manager 1120 may identify that the UE is to use the full-duplex configuration to transmit or receive the semi-persistent transmission if the semi-persistent transmission in the first link direction overlaps in the time domain with the dynamic transmission in the second link direction. In some examples, the configuration manager 1120 may identify that the UE is to use the half-duplex configuration to transmit or receive the semi-persistent transmission if the semi-persistent transmission in the first link direction fails to overlap in the time domain with the dynamic transmission in the second link direction. In some cases, the full-duplex configuration and the half-duplex configuration include different beams, different modulation and coding schemes, different precoding matrix indicators, different rank indicators, or a combination thereof.

The DCI manager 1125 may transmit downlink control information scheduling the dynamic transmission in the second link direction. The full-duplex manager 1115 may determine that the semi-persistent transmission overlaps in the time domain with the dynamic transmission based at least in part on transmitting the downlink control information.

In some examples, the DCI manager 1125 may transmit, in the downlink control information, an indication of a pair of configurations including a first configuration to be used by the UE to transmit or receive the dynamic transmission in the second link direction and a second configuration to be used by the UE to use to transmit or receive the semi-persistent transmission in the first link direction. The configuration manager 1120 may identify that the UE is to use the second configuration for transmitting or receiving the semi-persistent transmission based at least in part on transmitting the indication of the pair of configurations in the downlink control information. In some examples, the DCI manager 1125 may transmit, in the downlink control information, an indication of a first configuration to be used by the UE to transmit or receive the dynamic transmission in the second link direction. The configuration manager 1120 may identify that the UE is to use a second configuration to transmit or receive the semi-persistent transmission based at least in part on the first configuration indicated in the downlink control information.

In some cases, the first configuration and the second configuration include different beams, different modulation and coding schemes, different precoding matrix indicators, different rank indicators, or a combination thereof. In some cases, a pairing between a first beam in the first configuration and a second beam in the second configuration is predefined. In some cases, a relationship between the first configuration and the second configuration is predefined. In some cases, the downlink control information schedules the dynamic transmission in the second link direction from the base station to the UE. In some cases, the first link direction includes uplink and the second link direction includes downlink, or the first link direction includes downlink and the second link direction includes uplink.

In some examples, the grant-free transmission manager 1130 may transmit, to a first device, control signaling allocating resources for one or more semi-persistent transmissions in a first link direction. The grant-free transmission manager 1130 may communicate a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

In some examples, the configuration manager 1135 may transmit, in the control signaling, a full-duplex configuration and a half-duplex configuration for the first device to use to communicate the semi-persistent transmission.

In some examples, the configuration manager 1135 may identify that the first device is to use the full-duplex configuration to communicate the semi-persistent transmission based at least in part on the semi-persistent transmission in the first link direction overlapping in the time domain with the dynamic transmission in the second link direction. In some examples, the configuration manager 1135 may identify that the first device is to use the half-duplex configuration to communicate the semi-persistent transmission based at least in part on the semi-persistent transmission in the first link direction failing to overlap in the time domain with the dynamic transmission in the second link direction.

In some examples, the full-duplex configuration and the half-duplex configuration include different beams, different modulation and coding schemes, different precoding matrix indicators, different rank indicators, or a combination thereof.

In some examples, the DCI manager 1140 may transmit downlink control information scheduling the dynamic transmission in the second link direction. In some examples, the configuration manager 1135 may determine that the semi-persistent transmission overlaps in the time domain with the dynamic transmission based on transmitting the downlink control information.

In some examples, the DCI manager 1140 may transmit, in the downlink control information, an indication of a pair of configurations including a first configuration to be used by the first device to transmit or receive the dynamic transmission in the second link direction and a second configuration to be used by the first device to use to transmit or receive the semi-persistent transmission in the first link direction. In some examples, the configuration manager 1135 may identify that the first device is to use the second configuration for communicating the semi-persistent transmission based on transmitting the indication of the pair of configurations in the downlink control information.

In some examples, the first configuration and the second configuration include different beams, different modulation and coding schemes, different precoding matrix indicators, different rank indicators, or a combination thereof.

In some examples, the DCI manager 1140 may transmit, in the downlink control information, an indication of a first configuration to be used by the first device to communicate the dynamic transmission in the second link direction. In some examples, the configuration manager 1135 may identify that the first device is to use a second configuration to transmit or receive the semi-persistent transmission based on the first configuration indicated in the downlink control information.

In some examples, the first configuration and the second configuration include different beams, different modulation and coding schemes, different precoding matrix indicators, different rank indicators, or a combination thereof.

In some examples, a pairing between a first beam in the first configuration and a second beam in the second configuration is predefined, a relationship between the first configuration and the second configuration is predefined, or a combination thereof.

In some examples, the downlink control information schedules the dynamic transmission in the second link direction from the second device to the first device.

In some examples, the first link direction includes uplink and the second link direction includes downlink, the semi-persistent transmission including a configured grant transmission. In some examples, the first link direction includes downlink and the second link direction includes uplink, the semi-persistent transmission including a semi-persistent scheduling transmission.

In some examples, the first device includes a user equipment or a distributed unit. In some examples, the second device includes a base station or a centralized unit.

Figure 12:
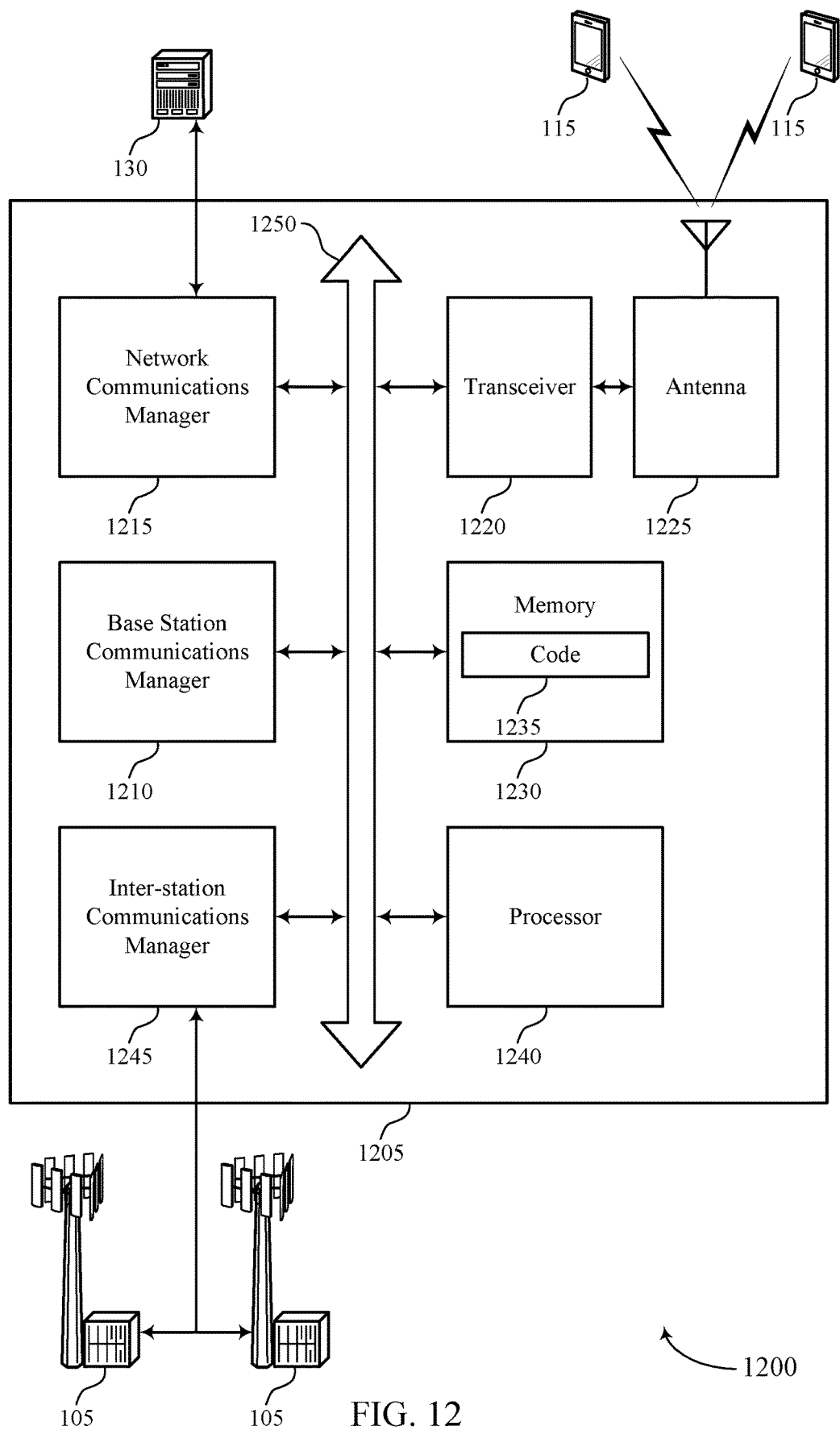
FIG. 12 shows a diagram of a system including a device that supports transmission configuration determination for grant-free transmissions in full-duplex systems in accordance with one or more aspects of the present disclosure.

FIG. 12 shows a diagram of a system 1200 including a device 1205 that supports transmission configuration determination for grant-free transmissions in full-duplex systems in accordance with one or more aspects of the present disclosure. The device 1205 may be an example of or include the components of device 905, device 1005, or a base station 105 as described herein. In some examples, the device 1205 may be referred to as a second device (e.g., a base station, a CU, a parent node, etc.). The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, control signaling allocating resources for one or more semi-persistent transmissions in a first link direction, the first link direction including an uplink or a downlink, determine whether a semi-persistent transmission of the one or more semi-persistent transmissions overlaps in a time domain with a dynamic transmission in a second link direction, the second link direction being different from the first link direction, identify a configuration to be used by the UE to transmit or receive the semi-persistent transmission based on the determining, and transmit or receive the semi-persistent transmission using a complementary configuration to the identified configuration.

In some examples, the base station communications manager 1210 may transmit, to a first device, control signaling allocating resources for one or more semi-persistent transmissions in a first link direction. The base station communications manager 1210 may communicate a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices. The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting transmission configuration determination for grant-free transmissions in full-duplex systems).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
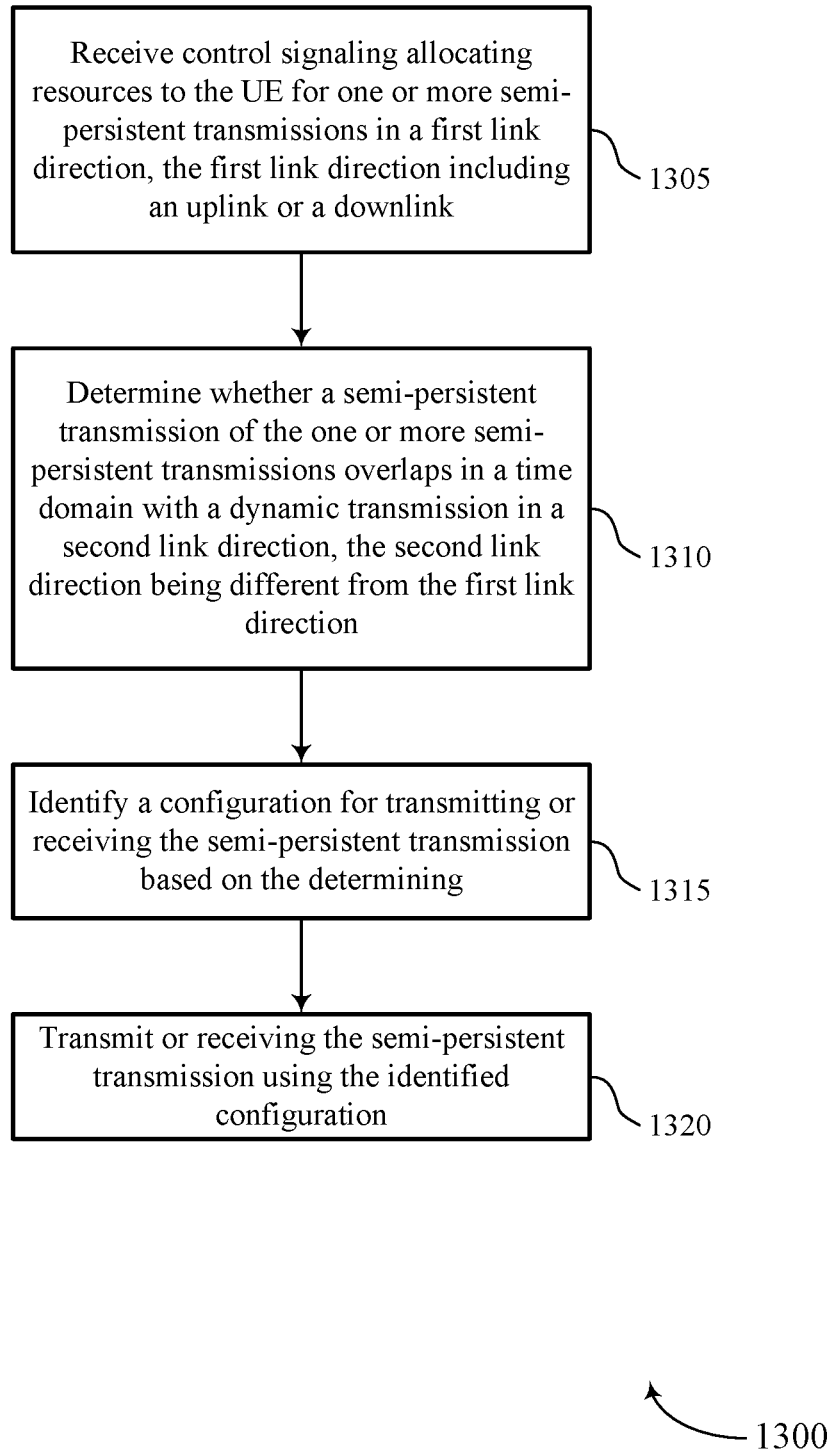
FIGS. 13 through 18 show flowcharts illustrating methods that support transmission configuration determination for grant-free transmissions in full-duplex systems in accordance with one or more aspects of the present disclosure.

FIG. 13 shows a flowchart illustrating a method 1300 that supports transmission configuration determination for grant-free transmissions in full-duplex systems in accordance with one or more aspects of the present disclosure. The operations of method 1300 may be implemented by a first device (e.g., a UE, a DU, a child node, etc.) or its components as described herein. That is, although aspects of the methods herein are described as being performed by a UE, the various operations may additionally or alternatively be performed by the first device as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive control signaling allocating resources to the UE for one or more semi-persistent transmissions in a first link direction, the first link direction including an uplink or a downlink. The operations of 1305 may be performed according to the methods described herein. In some examples, aspects of the operations of 1305 may be performed by a grant-free transmission manager as described with reference to FIGS. 5 through 8.

At 1310, the UE may determine whether a semi-persistent transmission of the one or more semi-persistent transmissions overlaps in a time domain with a dynamic transmission in a second link direction, the second link direction being different from the first link direction. The operations of 1310 may be performed according to the methods described herein. In some examples, aspects of the operations of 1310 may be performed by a full-duplex manager as described with reference to FIGS. 5 through 8.

At 1315, the UE may identify a configuration for transmitting or receiving the semi-persistent transmission based on the determining. The operations of 1315 may be performed according to the methods described herein. In some examples, aspects of the operations of 1315 may be performed by a configuration manager as described with reference to FIGS. 5 through 8.

At 1320, the UE may transmit or receive the semi-persistent transmission using the identified configuration. The operations of 1320 may be performed according to the methods described herein. In some examples, aspects of the operations of 1320 may be performed by a grant-free transmission manager as described with reference to FIGS. 5 through 8.

Figure 14:
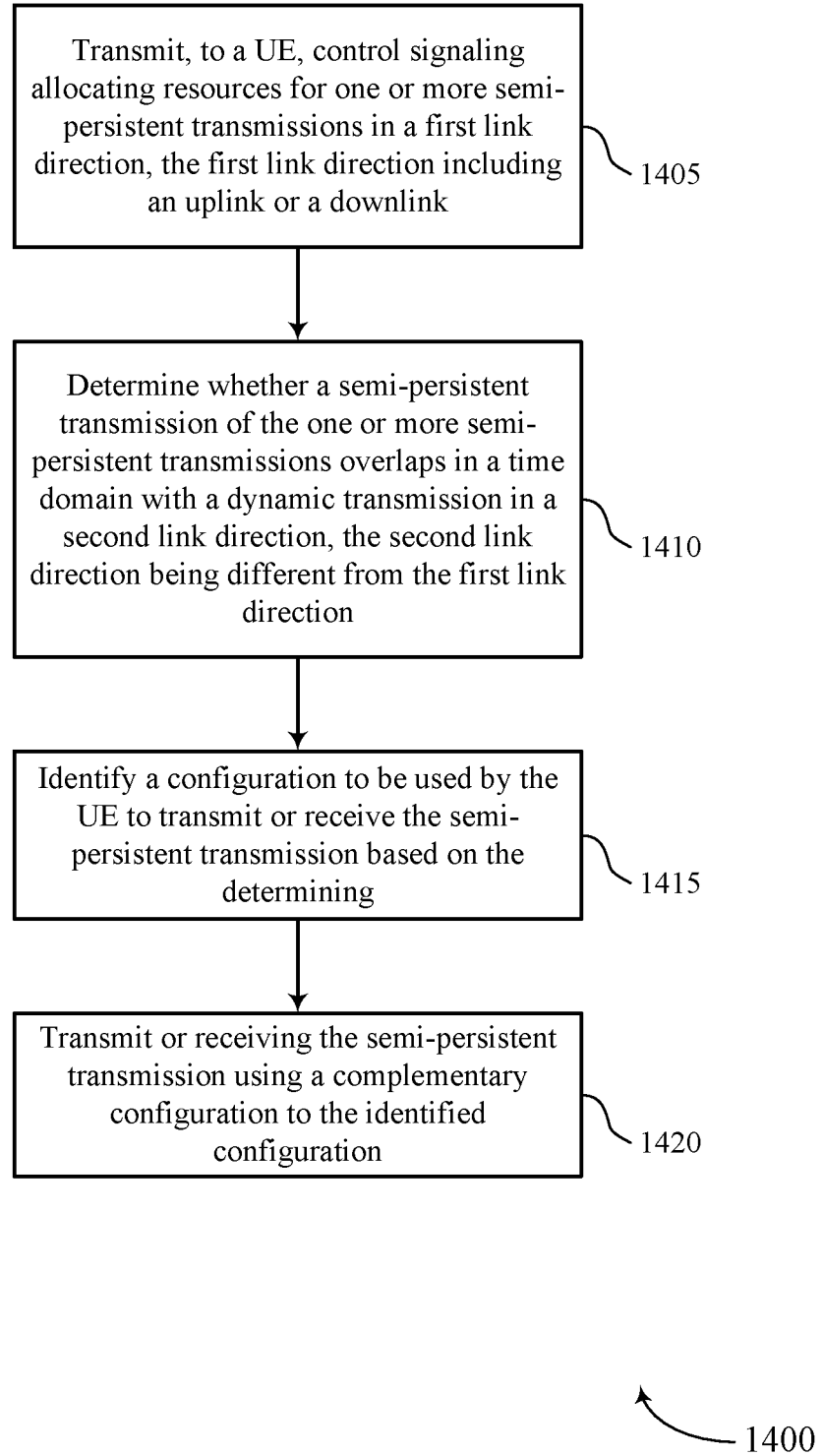

FIG. 14 shows a flowchart illustrating a method 1400 that supports transmission configuration determination for grant-free transmissions in full-duplex systems in accordance with one or more aspects of the present disclosure. The operations of method 1400 may be implemented by a second device (e.g., a base station, a CU, a parent node, etc.) or its components as described herein. That is, although aspects of the methods herein are described as being performed by a base station, the various operations may additionally or alternatively be performed by the second device as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may transmit, to a UE, control signaling allocating resources for one or more semi-persistent transmissions in a first link direction, the first link direction including an uplink or a downlink. The operations of 1405 may be performed according to the methods described herein. In some examples, aspects of the operations of 1405 may be performed by a grant-free transmission manager as described with reference to FIGS. 9 through 12.

At 1410, the base station may determine whether a semi-persistent transmission of the one or more semi-persistent transmissions overlaps in a time domain with a dynamic transmission in a second link direction, the second link direction being different from the first link direction. The operations of 1410 may be performed according to the methods described herein. In some examples, aspects of the operations of 1410 may be performed by a full-duplex manager as described with reference to FIGS. 9 through 12.

At 1415, the base station may identify a configuration to be used by the UE to transmit or receive the semi-persistent transmission based on the determining. The operations of 1415 may be performed according to the methods described herein. In some examples, aspects of the operations of 1415 may be performed by a configuration manager as described with reference to FIGS. 9 through 12.

At 1420, the base station may transmit or receive the semi-persistent transmission using a complementary configuration to the identified configuration. The operations of 1420 may be performed according to the methods described herein. In some examples, aspects of the operations of 1420 may be performed by a grant-free transmission manager as described with reference to FIGS. 9 through 12.

Figure 15:
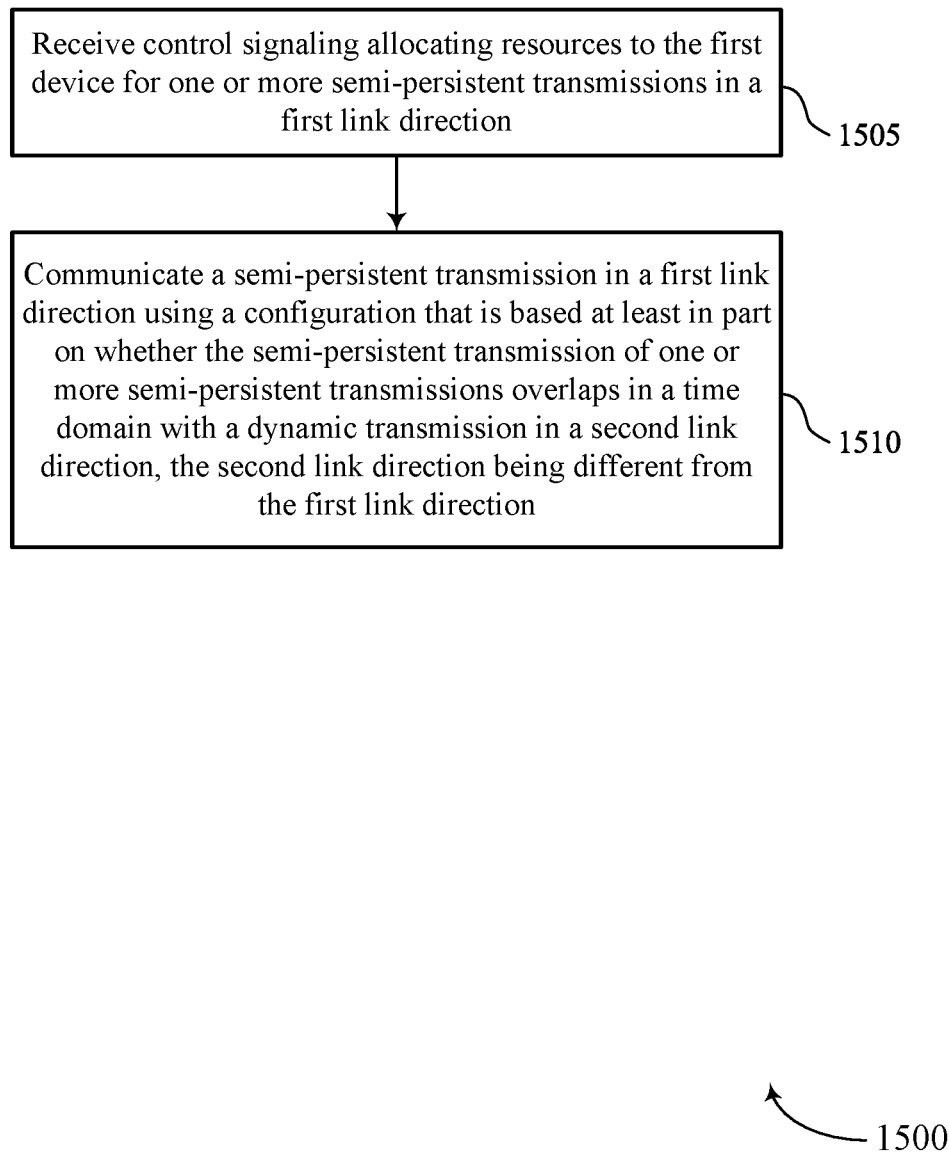

FIG. 15 shows a flowchart illustrating a method 1500 that supports transmission configuration determination for grant-free transmissions in full-duplex systems in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving control signaling allocating resources to the first device for one or more semi-persistent transmissions in a first link direction. The operations of 1505 may be performed in accordance with examples as disclosed herein. In some examples, aspects of the operations of 1505 may be performed by a grant-free transmission manager 710 as described with reference to FIG. 7.

At 1510, the method may include communicating a semi-persistent transmission in a first link direction using a configuration that is based on whether the semi-persistent transmission of one or more semi-persistent transmissions overlaps in a time domain with a dynamic transmission in a second link direction, the second link direction being different from the first link direction. The operations of 1510 may be performed in accordance with examples as disclosed herein. In some examples, aspects of the operations of 1510 may be performed by a grant-free transmission manager 710 as described with reference to FIG. 7.

Figure 16:
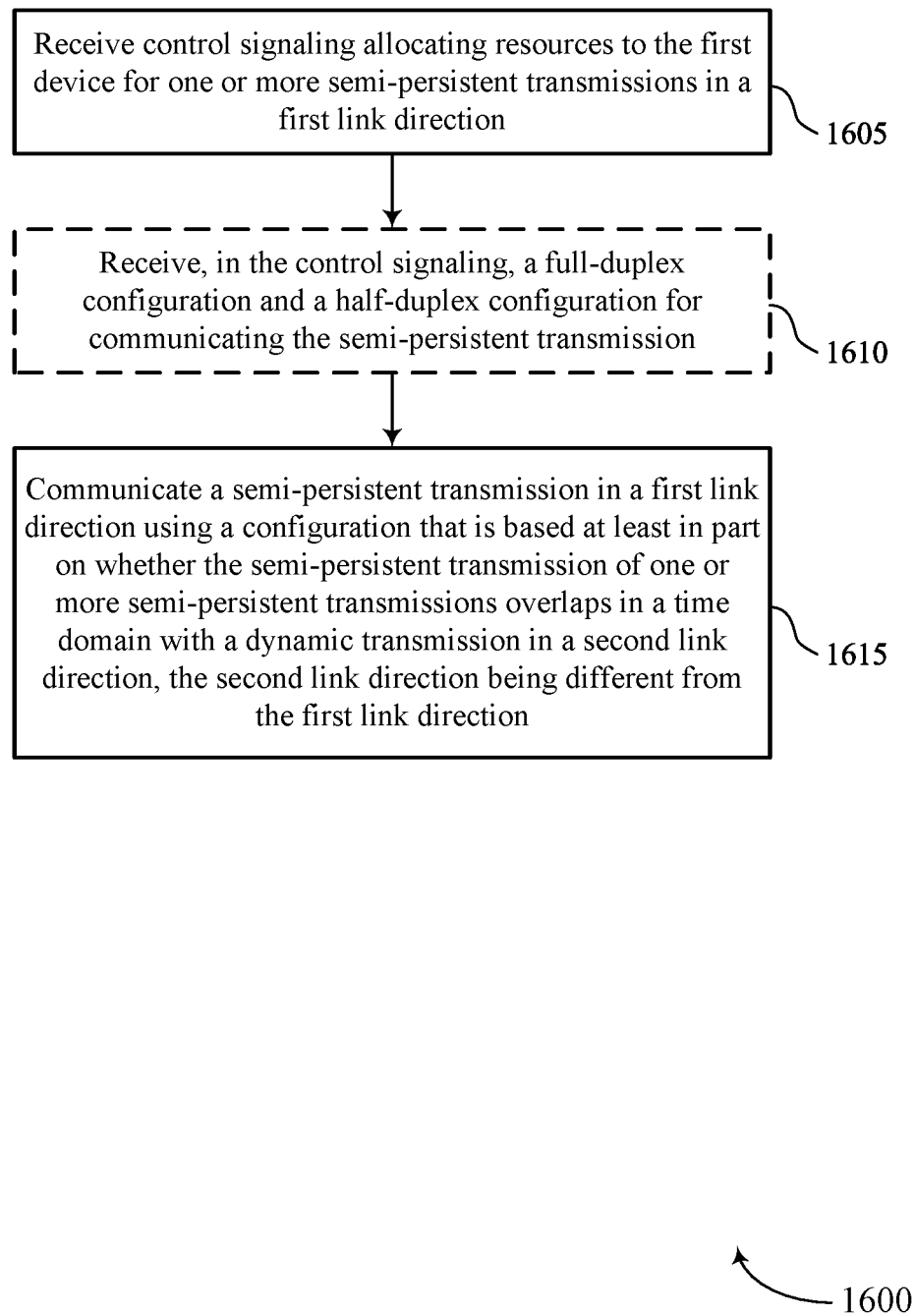

FIG. 16 shows a flowchart illustrating a method 1600 that supports transmission configuration determination for grant-free transmissions in full-duplex systems in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving control signaling allocating resources to the first device for one or more semi-persistent transmissions in a first link direction. The operations of 1605 may be performed in accordance with examples as disclosed herein. In some examples, aspects of the operations of 1605 may be performed by a grant-free transmission manager 710 as described with reference to FIG. 7.

In some examples, at 1610 the method may include receiving, in the control signaling, a full-duplex configuration and a half-duplex configuration for communicating the semi-persistent transmission. The operations of 1610 may be performed in accordance with examples as disclosed herein. In some examples, aspects of the operations of 1610 may be performed by a configuration manager 720 as described with reference to FIG. 7.

At 1615, the method may include communicating a semi-persistent transmission in a first link direction using a configuration that is based on whether the semi-persistent transmission of one or more semi-persistent transmissions overlaps in a time domain with a dynamic transmission in a second link direction, the second link direction being different from the first link direction. The operations of 1615 may be performed in accordance with examples as disclosed herein. In some examples, aspects of the operations of 1615 may be performed by a grant-free transmission manager 710 as described with reference to FIG. 7.

Figure 17:
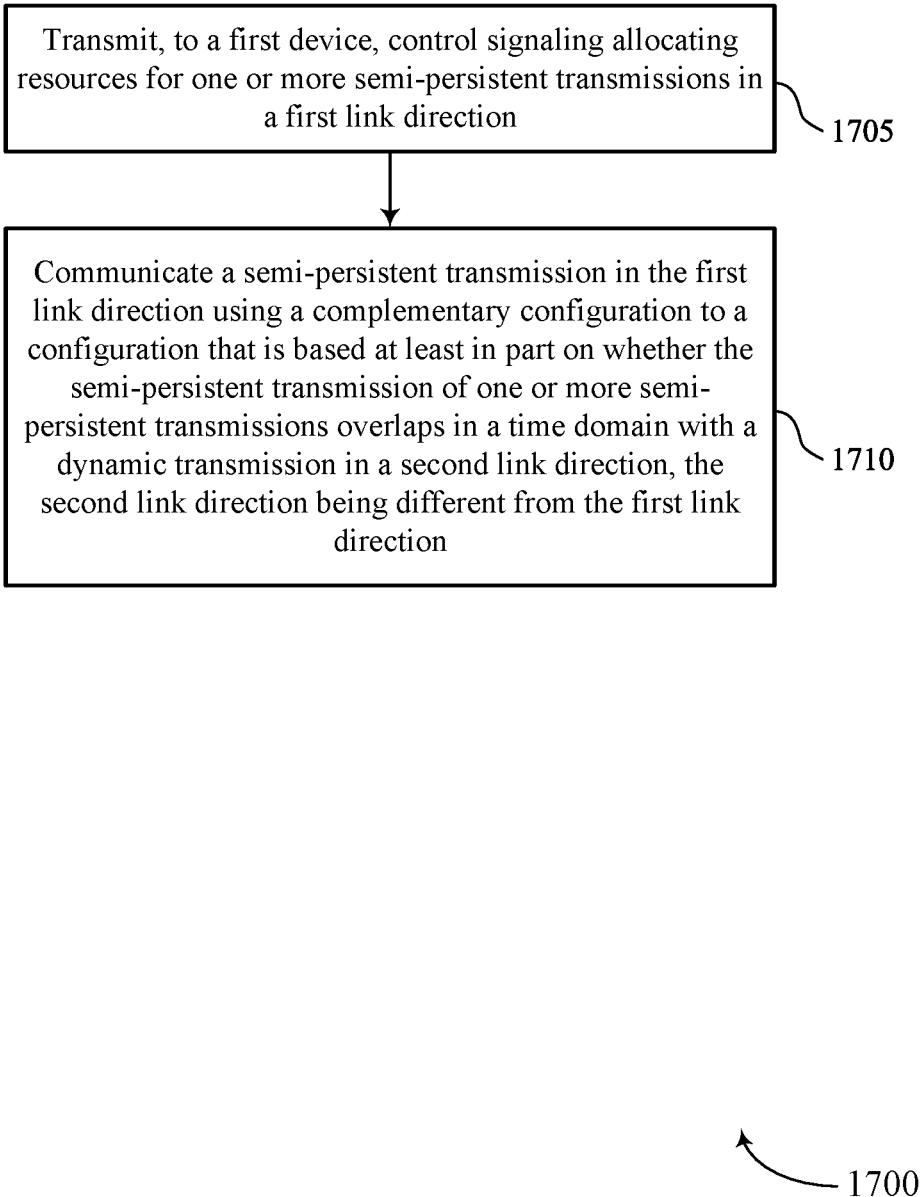

FIG. 17 shows a flowchart illustrating a method 1700 that supports transmission configuration determination for grant-free transmissions in full-duplex systems in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a first device, control signaling allocating resources for one or more semi-persistent transmissions in a first link direction. The operations of 1705 may be performed in accordance with examples as disclosed herein. In some examples, aspects of the operations of 1705 may be performed by a grant-free transmission manager 1110 as described with reference to FIG. 11.

At 1710, the method may include communicating a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction. The operations of 1710 may be performed in accordance with examples as disclosed herein. In some examples, aspects of the operations of 1710 may be performed by a grant-free transmission manager 1110 as described with reference to FIG. 11.

Figure 18:
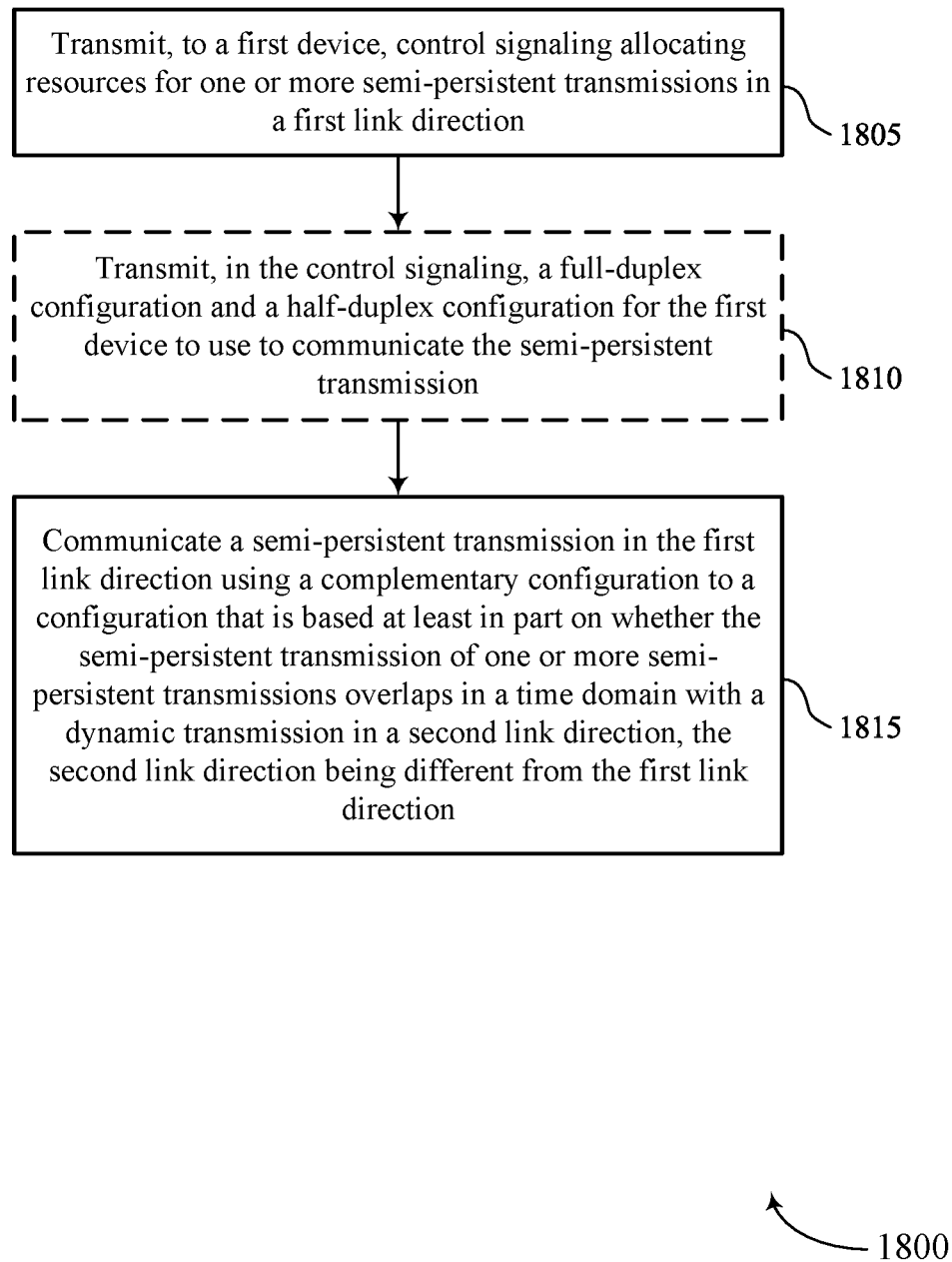

FIG. 18 shows a flowchart illustrating a method 1800 that supports transmission configuration determination for grant-free transmissions in full-duplex systems in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a first device, control signaling allocating resources for one or more semi-persistent transmissions in a first link direction. The operations of 1805 may be performed in accordance with examples as disclosed herein. In some examples, aspects of the operations of 1805 may be performed by a grant-free transmission manager 1110 as described with reference to FIG. 11.

In some examples, at 1810 the method may include transmitting, in the control signaling, a full-duplex configuration and a half-duplex configuration for the first device to use to communicate the semi-persistent transmission. The operations of 1810 may be performed in accordance with examples as disclosed herein. In some examples, aspects of the operations of 1810 may be performed by a configuration manager 1120 as described with reference to FIG. 11.

At 1815, the method may include communicating a semi-persistent transmission in the first link direction using a complementary configuration to a configuration that is based on whether the semi-persistent transmission of one or more semi-persistent transmissions overlaps in a time domain with a dynamic transmission in a second link direction, the second link direction being different from the first link direction. The operations of 1815 may be performed in accordance with examples as disclosed herein. In some examples, aspects of the operations of 1815 may be performed by a grant-free transmission manager 1110 as described with reference to FIG. 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device, comprising: receiving control signaling allocating resources to the first device for one or more semi-persistent transmissions in a first link direction; and communicating a semi-persistent transmission in a first link direction using a configuration that is based at least in part on whether the semi-persistent transmission of one or more semi-persistent transmissions overlaps in a time domain with a dynamic transmission in a second link direction, the second link direction being different from the first link direction.

Aspect 2: The method of aspect 1, further comprising: receiving, in the control signaling, a full-duplex configuration and a half-duplex configuration for communicating the semi-persistent transmission.

Aspect 3: The method of aspect 2, further comprising: identifying the full-duplex configuration for communicating the semi-persistent transmission based at least in part on the semi-persistent transmission in the first link direction overlapping in the time domain with the dynamic transmission in the second link direction; and identifying the half-duplex configuration for communicating the semi-persistent transmission based at least in part on the semi-persistent transmission in the first link direction failing to overlap in the time domain with the dynamic transmission in the second link direction.

Aspect 4: The method of any of aspects 2 through 3, wherein the full-duplex configuration and the half-duplex configuration comprise different beams, different modulation and coding schemes, different precoding matrix indicators, different rank indicators, or a combination thereof.

Aspect 5: The method of any of aspects 1 through 4, further comprising: receiving downlink control information scheduling the dynamic transmission in the second link direction; and determining that the semi-persistent transmission overlaps in the time domain with the dynamic transmission based at least in part on receiving the downlink control information.

Aspect 6: The method of aspect 5, further comprising: receiving, in the downlink control information, an indication of a pair of configurations comprising a first configuration for communicating the dynamic transmission in the second link direction and a second configuration for communicating the semi-persistent transmission in the first link direction; and identifying the second configuration for communicating the semi-persistent transmission based at least in part on receiving the indication of the pair of configurations in the downlink control information.

Aspect 7: The method of aspect 6, wherein the first configuration and the second configuration comprise different beams, different modulation and coding schemes, different precoding matrix indicators, different rank indicators, or a combination thereof.

Aspect 8: The method of any of aspects 5 through 7, further comprising: receiving, in the downlink control information, an indication of a first configuration for communicating the dynamic transmission in the second link direction; and identifying a second configuration for communicating the semi-persistent transmission based at least in part on the first configuration indicated in the downlink control information.

Aspect 9: The method of aspect 8, wherein the first configuration and the second configuration comprise different beams, different modulation and coding schemes, different precoding matrix indicators, different rank indicators, or a combination thereof.

Aspect 10: The method of any of aspects 8 through 9, wherein a pairing between a first beam in the first configuration and a second beam in the second configuration is predefined, a relationship between the first configuration and the second configuration is predefined, or a combination thereof.

Aspect 11: The method of any of aspects 5 through 10, wherein the downlink control information schedules the dynamic transmission in the second link direction to the first device.

Aspect 12: The method of any of aspects 1 through 11, wherein the first link direction comprises uplink and the second link direction comprises downlink, the semi-persistent transmission comprising a configured grant transmission; or wherein the first link direction comprises downlink and the second link direction comprises uplink, the semi-persistent transmission comprising a semi-persistent scheduling transmission.

Aspect 13: The method of any of aspects 1 through 12, wherein the first device comprises a user equipment or a distributed unit, and the second device comprises a base station or a centralized unit.

Aspect 14: A method for wireless communication at a second device, comprising: transmitting, to a first device, control signaling allocating resources for one or more semi-persistent transmissions in a first link direction; and communicating a semi-persistent transmission in the first link direction using a complementary configuration to a configuration that is based at least in part on whether the semi-persistent transmission of one or more semi-persistent transmissions overlaps in a time domain with a dynamic transmission in a second link direction, the second link direction being different from the first link direction.

Aspect 15: The method of aspect 14, further comprising: transmitting, in the control signaling, a full-duplex configuration and a half-duplex configuration for the first device to use to communicate the semi-persistent transmission.

Aspect 16: The method of aspect 15, further comprising: identifying that the first device is to use the full-duplex configuration to communicate the semi-persistent transmission based at least in part on the semi-persistent transmission in the first link direction overlapping in the time domain with the dynamic transmission in the second link direction; and identifying that the first device is to use the half-duplex configuration to communicate the semi-persistent transmission based at least in part on the semi-persistent transmission in the first link direction failing to overlap in the time domain with the dynamic transmission in the second link direction.

Aspect 17: The method of any of aspects 15 through 16, wherein the full-duplex configuration and the half-duplex configuration comprise different beams, different modulation and coding schemes, different precoding matrix indicators, different rank indicators, or a combination thereof.

Aspect 18: The method of any of aspects 14 through 17, further comprising: transmitting downlink control information scheduling the dynamic transmission in the second link direction; and determining that the semi-persistent transmission overlaps in the time domain with the dynamic transmission based at least in part on transmitting the downlink control information.

Aspect 19: The method of aspect 18, further comprising: transmitting, in the downlink control information, an indication of a pair of configurations comprising a first configuration to be used by the first device to transmit or receive the dynamic transmission in the second link direction and a second configuration to be used by the first device to use to transmit or receive the semi-persistent transmission in the first link direction; and identifying that the first device is to use the second configuration for communicating the semi-persistent transmission based at least in part on transmitting the indication of the pair of configurations in the downlink control information.

Aspect 20: The method of aspect 19, wherein the first configuration and the second configuration comprise different beams, different modulation and coding schemes, different precoding matrix indicators, different rank indicators, or a combination thereof.

Aspect 21: The method of any of aspects 18 through 20, further comprising: transmitting, in the downlink control information, an indication of a first configuration to be used by the first device to communicate the dynamic transmission in the second link direction; and identifying that the first device is to use a second configuration to transmit or receive the semi-persistent transmission based at least in part on the first configuration indicated in the downlink control information.

Aspect 22: The method of aspect 21, wherein the first configuration and the second configuration comprise different beams, different modulation and coding schemes, different precoding matrix indicators, different rank indicators, or a combination thereof.

Aspect 23: The method of any of aspects 21 through 22, wherein a pairing between a first beam in the first configuration and a second beam in the second configuration is predefined, a relationship between the first configuration and the second configuration is predefined, or a combination thereof.

Aspect 24: The method of any of aspects 18 through 23, wherein the downlink control information schedules the dynamic transmission in the second link direction from the second device to the first device.

Aspect 25: The method of any of aspects 14 through 24, wherein the first link direction comprises uplink and the second link direction comprises downlink, the semi-persistent transmission comprising a configured grant transmission; or wherein the first link direction comprises downlink and the second link direction comprises uplink, the semi-persistent transmission comprising a semi-persistent scheduling transmission.

Aspect 26: The method of any of aspects 14 through 25, wherein the first device comprises a user equipment or a distributed unit, and the second device comprises a base station or a centralized unit.

Aspect 27: A method for wireless communication at a UE, comprising: receiving control signaling allocating resources to the UE for one or more semi-persistent transmissions in a first link direction, the first link direction comprising an uplink or a downlink; determining whether a semi-persistent transmission of the one or more semi-persistent transmissions overlaps in a time domain with a dynamic transmission in a second link direction, the second link direction being different from the first link direction; identifying a configuration for transmitting or receiving the semi-persistent transmission based at least in part on the determining; and transmitting or receiving the semi-persistent transmission using the identified configuration.

Aspect 28: The method of aspect 27, further comprising: receiving, in the control signaling, a full-duplex configuration and a half-duplex configuration for transmitting or receiving the semi-persistent transmission, wherein identifying the configuration for transmitting or receiving the semi-persistent transmission based at least in part on the determining comprises: identifying the full-duplex configuration or the half-duplex configuration for transmitting or receiving the semi-persistent transmission based at least in part on the determining.

Aspect 29: The method of aspect 28, wherein identifying the full-duplex configuration or the half-duplex configuration for transmitting or receiving the semi-persistent transmission based at least in part on the determining comprises: identifying the full-duplex configuration for transmitting or receiving the semi-persistent transmission if the semi-persistent transmission in the first link direction overlaps in the time domain with the dynamic transmission in the second link direction; and identifying the half-duplex configuration for transmitting or receiving the semi-persistent transmission if the semi-persistent transmission in the first link direction fails to overlap in the time domain with the dynamic transmission in the second link direction.

Aspect 30: The method of any of aspects 28 through 29, wherein the full-duplex configuration and the half-duplex configuration comprise different beams, different modulation and coding schemes, different precoding matrix indicators, different rank indicators, or a combination thereof.

Aspect 31: The method of any of aspects 27 through 30, further comprising: receiving downlink control information scheduling the dynamic transmission in the second link direction, wherein determining whether the semi-persistent transmission overlaps in the time domain with the dynamic transmission comprises: determining that the semi-persistent transmission overlaps in the time domain with the dynamic transmission based at least in part on receiving the downlink control information.

Aspect 32: The method of aspect 31, further comprising: receiving, in the downlink control information, an indication of a pair of configurations comprising a first configuration for transmitting or receiving the dynamic transmission in the second link direction and a second configuration for transmitting or receiving the semi-persistent transmission in the first link direction and, wherein identifying the configuration for transmitting or receiving the semi-persistent transmission comprises: identifying the second configuration for transmitting or receiving the semi-persistent transmission based at least in part on receiving the indication of the pair of configurations in the downlink control information.

Aspect 33: The method of aspect 32, wherein the first configuration and the second configuration comprise different beams, different modulation and coding schemes, different precoding matrix indicators, different rank indicators, or a combination thereof.

Aspect 34: The method of any of aspects 31 through 33, further comprising: receiving, in the downlink control information, an indication of a first configuration for transmitting or receiving the dynamic transmission in the second link direction, wherein identifying the configuration for transmitting or receiving the semi-persistent transmission comprises: identifying a second configuration for transmitting or receiving the semi-persistent transmission based at least in part on the first configuration indicated in the downlink control information.

Aspect 35: The method of aspect 34, wherein the first configuration and the second configuration comprise different beams, different modulation and coding schemes, different precoding matrix indicators, different rank indicators, or a combination thereof.

Aspect 36: The method of any of aspects 34 through 35, wherein a pairing between a first beam in the first configuration and a second beam in the second configuration is predefined.

Aspect 37: The method of any of aspects 34 through 36, wherein a relationship between the first configuration and the second configuration is predefined.

Aspect 38: The method of any of aspects 31 through 37, wherein the downlink control information schedules the dynamic transmission in the second link direction to the UE.

Aspect 39: The method of any of aspects 27 through 38, wherein the first link direction comprises uplink and the second link direction comprises downlink, or the first link direction comprises downlink and the second link direction comprises uplink.

Aspect 40: A method for wireless communication at a base station, comprising: transmitting, to a UE, control signaling allocating resources for one or more semi-persistent transmissions in a first link direction, the first link direction comprising an uplink or a downlink; determining whether a semi-persistent transmission of the one or more semi-persistent transmissions overlaps in a time domain with a dynamic transmission in a second link direction, the second link direction being different from the first link direction; identifying a configuration to be used by the UE to transmit or receive the semi-persistent transmission based at least in part on the determining; and transmitting or receiving the semi-persistent transmission using a complementary configuration to the identified configuration.

Aspect 41: The method of aspect 40, further comprising: transmitting, in the control signaling, a full-duplex configuration and a half-duplex configuration for the UE to use to transmit or receive the semi-persistent transmission, wherein identifying the configuration to be used by the UE to transmit or receive the semi-persistent transmission based at least in part on the determining comprises: identifying that the UE is to use the full-duplex configuration or the half-duplex configuration to transmit or receive the semi-persistent transmission based at least in part on the determining.

Aspect 42: The method of aspect 41, wherein identifying that the UE is to use the full-duplex configuration or the half-duplex configuration to transmit or receive the semi-persistent transmission based at least in part on the determining comprises: identifying that the UE is to use the full-duplex configuration to transmit or receive the semi-persistent transmission if the semi-persistent transmission in the first link direction overlaps in the time domain with the dynamic transmission in the second link direction; and identifying that the UE is to use the half-duplex configuration to transmit or receive the semi-persistent transmission if the semi-persistent transmission in the first link direction fails to overlap in the time domain with the dynamic transmission in the second link direction.

Aspect 43: The method of any of aspects 41 through 42, wherein the full-duplex configuration and the half-duplex configuration comprise different beams, different modulation and coding schemes, different precoding matrix indicators, different rank indicators, or a combination thereof.

Aspect 44: The method of any of aspects 40 through 43, further comprising: transmitting downlink control information scheduling the dynamic transmission in the second link direction, wherein determining whether the semi-persistent transmission overlaps in the time domain with the dynamic transmission comprises: determining that the semi-persistent transmission overlaps in the time domain with the dynamic transmission based at least in part on transmitting the downlink control information.

Aspect 45: The method of aspect 44, further comprising: transmitting, in the downlink control information, an indication of a pair of configurations comprising a first configuration to be used by the UE to transmit or receive the dynamic transmission in the second link direction and a second configuration to be used by the UE to use to transmit or receive the semi-persistent transmission in the first link direction and, wherein identifying the configuration to be used by the UE to transmit or receive the semi-persistent transmission comprises: identifying that the UE is to use the second configuration for transmitting or receiving the semi-persistent transmission based at least in part on transmitting the indication of the pair of configurations in the downlink control information.

Aspect 46: The method of aspect 45, wherein the first configuration and the second configuration comprise different beams, different modulation and coding schemes, different precoding matrix indicators, different rank indicators, or a combination thereof.

Aspect 47: The method of any of aspects 44 through 46, further comprising: transmitting, in the downlink control information, an indication of a first configuration to be used by the UE to transmit or receive the dynamic transmission in the second link direction, wherein identifying the configuration to be used by the UE to transmit or receive the semi-persistent transmission comprises: identifying that the UE is to use a second configuration to transmit or receive the semi-persistent transmission based at least in part on the first configuration indicated in the downlink control information.

Aspect 48: The method of aspect 47, wherein the first configuration and the second configuration comprise different beams, different modulation and coding schemes, different precoding matrix indicators, different rank indicators, or a combination thereof.

Aspect 49: The method of any of aspects 47 through 48, wherein a pairing between a first beam in the first configuration and a second beam in the second configuration is predefined.

Aspect 50: The method of any of aspects 47 through 49, wherein a relationship between the first configuration and the second configuration is predefined.

Aspect 51: The method of any of aspects 44 through 50, wherein the downlink control information schedules the dynamic transmission in the second link direction from the base station to the UE.

Aspect 52: The method of any of aspects 40 through 51, wherein the first link direction comprises uplink and the second link direction comprises downlink, or the first link direction comprises downlink and the second link direction comprises uplink.

Aspect 53: An apparatus for wireless communication at a first device, comprising a processor; and memory coupled to the processor, the processor and the memory configured to perform a method of any of aspects 1 through 13.

Aspect 54: An apparatus for wireless communication at a first device, comprising at least one means for performing a method of any of aspects 1 through 13.

Aspect 55: A non-transitory computer-readable medium storing code for wireless communication at a first device, the code comprising instructions executable by a processor to perform a method of any of aspects 1 through 13.

Aspect 56: An apparatus for wireless communication at a second device, comprising a processor; and memory coupled to the processor, the processor and the memory configured to perform a method of any of aspects 14 through 26.

Aspect 57: An apparatus for wireless communication at a second device, comprising at least one means for performing a method of any of aspects 14 through 26.

Aspect 58: A non-transitory computer-readable medium storing code for wireless communication at a second device, the code comprising instructions executable by a processor to perform a method of any of aspects 14 through 26.

Aspect 59: An apparatus for wireless communication at a UE, comprising a processor; and memory coupled to the processor, the processor and the memory configured to perform a method of any of aspects 27 through 39.

Aspect 60: An apparatus for wireless communication at a UE, comprising at least one means for performing a method of any of aspects 27 through 39.

Aspect 61: A non-transitory computer-readable medium storing code for wireless communication at a UE, the code comprising instructions executable by a processor to perform a method of any of aspects 27 through 39.

Aspect 62: An apparatus for wireless communication at a base station, comprising a processor; and memory coupled to the processor, the processor and the memory configured to perform a method of any of aspects 40 through 52.

Aspect 63: An apparatus for wireless communication at a base station, comprising at least one means for performing a method of any of aspects 40 through 52.

Aspect 64: A non-transitory computer-readable medium storing code for wireless communication at a base station, the code comprising instructions executable by a processor to perform a method of any of aspects 40 through 52.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first wireless communication device, comprising:
  one or more memories; and
  one or more processors coupled with the one or more memories and configured to cause the first wireless communication device to:
    receive control signaling that allocates resources to the first wireless communication device for one or more semi-persistent transmissions in a first link direction; and
    communicate a semi-persistent transmission in the first link direction in accordance with a first configuration associated with full-duplex communications or a second configuration associated with half-duplex communications, wherein the communication of the semi-persistent transmission in accordance with the first configuration or the second configuration is based at least in part on whether the semi-persistent transmission of the one or more semi-persistent transmissions overlaps in a time domain with a dynamic transmission in a second link direction, wherein the second link direction is different from the first link direction.

2. The apparatus of claim 1, wherein the one or more processors are configured to cause the first wireless communication device to:
receive, in the control signaling and via an antenna of the first wireless communication device, a full-duplex configuration and a half-duplex configuration associated with communication of the semi-persistent transmission, wherein the first configuration comprises the full-duplex configuration and the second configuration comprises the half-duplex configuration.

3. The apparatus of claim 2, wherein the one or more processors are configured to cause the first wireless communication device to:
identify the full-duplex configuration based at least in part on an overlap in the time domain of the semi-persistent transmission in the first link direction with the dynamic transmission in the second link direction; and
identify the half-duplex configuration based at least in part on a failure of the semi-persistent transmission in the first link direction to overlap in the time domain with the dynamic transmission in the second link direction.

4. The apparatus of claim 2, wherein the full-duplex configuration and the half-duplex configuration comprise different beams, different modulation and coding schemes, different precoding matrix indicators, different rank indicators, or a combination thereof.

5. The apparatus of claim 1, wherein the one or more processors are configured to cause the first wireless communication device to:
receive downlink control information that schedules the dynamic transmission in the second link direction; and
determine that the semi-persistent transmission overlaps in the time domain with the dynamic transmission based at least in part on the reception of the downlink control information.

6. The apparatus of claim 5, wherein the one or more processors are configured to cause the first wireless communication device to:
receive, in the downlink control information, an indication of a pair of configurations that comprises a third configuration associated with communication of the dynamic transmission in the second link direction and a fourth configuration associated with communication of the semi-persistent transmission in the first link direction; and
identify the fourth configuration associated with communication of the semi-persistent transmission based at least in part on the reception of the indication of the pair of configurations in the downlink control information.

7. The apparatus of claim 6, wherein the third configuration and the fourth configuration comprise different beams, different modulation and coding schemes, different precoding matrix indicators, different rank indicators, or a combination thereof.

8. The apparatus of claim 5, wherein the one or more processors are configured to cause the first wireless communication device to:
receive, in the downlink control information, an indication of a third configuration associated with communication of the dynamic transmission in the second link direction; and
identify a fourth configuration associated with communication of the semi-persistent transmission based at least in part on the third configuration indicated in the downlink control information.

9. The apparatus of claim 8, wherein the third configuration and the fourth configuration comprise different beams, different modulation and coding schemes, different precoding matrix indicators, different rank indicators, or a combination thereof.

10. The apparatus of claim 8, wherein a pairing between a first beam in the third configuration and a second beam in the fourth configuration is predefined, a relationship between the first configuration and the second configuration is predefined, or a combination thereof.

11. The apparatus of claim 5, wherein the downlink control information schedules the dynamic transmission in the second link direction to the first wireless communication device.

12. The apparatus of claim 1, wherein the first link direction comprises uplink and the second link direction comprises downlink, wherein the semi-persistent transmission comprises a configured grant transmission; or
wherein the first link direction comprises downlink and the second link direction comprises uplink, wherein the semi-persistent transmission comprises a semi-persistent scheduling transmission.

13. The apparatus of claim 1, wherein:
the first wireless communication device comprises a user equipment or a distributed unit, and
a second wireless communication device comprises a base station or a centralized unit.

14. An apparatus for wireless communication at a second wireless communication device, comprising:
one or more memories; and
one or more processors coupled with the one or more memories and configured to cause the second wireless communication device to:
transmit, to a first wireless communication device, control signaling that allocates resources for one or more semi-persistent transmissions in a first link direction; and
communicate a semi-persistent transmission in the first link direction in accordance with a first complementary configuration to a first configuration associated with full-duplex communications or a second complementary configuration to a second configuration associated with half-duplex communications, communication of the semi-persistent transmission in accordance with the first complementary configuration or the second complementary configuration based at least in part on whether the semi-persistent transmission of the one or more semi-persistent transmissions overlaps in a time domain with a dynamic transmission in a second link direction, wherein the second link direction is different from the first link direction.

15. The apparatus of claim 14, wherein the one or more processors are configured to cause the second wireless communication device to:
transmit, in the control signaling and via an antenna of the second wireless communication device, a full-duplex configuration and a half-duplex configuration for the first wireless communication device to use to communicate the semi-persistent transmission, wherein the first configuration comprises the full-duplex configuration and the second configuration comprises the half-duplex configuration.

16. The apparatus of claim 15, wherein the one or more processors are configured to cause the second wireless communication device to:
  identify that the first wireless communication device is to use the full-duplex configuration to communicate the semi-persistent transmission based at least in part on an overlap in the time domain of the semi-persistent transmission in the first link direction with the dynamic transmission in the second link direction; and
  identify that the first wireless communication device is to use the half-duplex configuration to communicate the semi-persistent transmission based at least in part on a failure of the semi-persistent transmission in the first link direction to overlap in the time domain with the dynamic transmission in the second link direction.

17. The apparatus of claim 15, wherein the full-duplex configuration and the half-duplex configuration comprise different beams, different modulation and coding schemes, different precoding matrix indicators, different rank indicators, or a combination thereof.

18. The apparatus of claim 14, wherein the one or more processors are configured to cause the second wireless communication device to:
  transmit downlink control information that schedules the dynamic transmission in the second link direction; and
  determine that the semi-persistent transmission overlaps in the time domain with the dynamic transmission based at least in part on the transmission of the downlink control information.

19. The apparatus of claim 18, wherein the one or more processors are configured to cause the second wireless communication device to:
  transmit, in the downlink control information, an indication of a pair of configurations that comprises a third configuration to be used by the first wireless communication device to transmit or receive the dynamic transmission in the second link direction and a fourth configuration to be used by the first wireless communication device to transmit or receive the semi-persistent transmission in the first link direction; and
  identify that the first wireless communication device is to use the fourth configuration to communicate the semi-persistent transmission based at least in part on the transmission of the indication of the pair of configurations in the downlink control information.

20. The apparatus of claim 19, wherein the third configuration and the fourth configuration comprise different beams, different modulation and coding schemes, different precoding matrix indicators, different rank indicators, or a combination thereof.

21. The apparatus of claim 18, wherein the one or more processors are configured to cause the second wireless communication device to:
  transmit, in the downlink control information, an indication of a third configuration to be used by the first wireless communication device to communicate the dynamic transmission in the second link direction; and
  identify that the first wireless communication device is to use a fourth configuration to transmit or receive the semi-persistent transmission based at least in part on the third configuration indicated in the downlink control information.

22. The apparatus of claim 21, wherein the third configuration and the fourth configuration comprise different beams, different modulation and coding schemes, different precoding matrix indicators, different rank indicators, or a combination thereof.

23. The apparatus of claim 21, wherein a pairing between a first beam in the third configuration and a second beam in the fourth configuration is predefined, a relationship between the third configuration and the fourth configuration is predefined, or a combination thereof.

24. The apparatus of claim 18, wherein the downlink control information schedules the dynamic transmission in the second link direction from the second wireless communication device to the first wireless communication device.

25. The apparatus of claim 14, wherein the first link direction comprises uplink and the second link direction comprises downlink, wherein the semi-persistent transmission comprises a configured grant transmission; or
  wherein the first link direction comprises downlink and the second link direction comprises uplink, wherein the semi-persistent transmission comprises a semi-persistent scheduling transmission.

26. The apparatus of claim 14, wherein:
  the first wireless communication device comprises a user equipment or a distributed unit, and
  the second wireless communication device comprises a base station or a centralized unit.

27. A method for wireless communication at a first wireless communication device, comprising:
  receiving control signaling allocating resources to the first wireless communication device for one or more semi-persistent transmissions in a first link direction; and
  communicating a semi-persistent transmission in the first link direction in accordance with a first configuration associated with full-duplex communications or a second configuration associated with half-duplex communications, the communication of the semi-persistent transmission in accordance with the first configuration or the second configuration being based at least in part on whether the semi-persistent transmission of the one or more semi-persistent transmissions overlaps in a time domain with a dynamic transmission in a second link direction, the second link direction being different from the first link direction.

28. The method of claim 27, further comprising:
  receiving, in the control signaling, a full-duplex configuration and a half-duplex configuration for communicating the semi-persistent transmission, the first configuration comprising the full-duplex configuration and the second configuration comprising the half-duplex configuration.

29. A method for wireless communication at a second wireless communication device, comprising:
  transmitting, to a first wireless communication device, control signaling allocating resources for one or more semi-persistent transmissions in a first link direction; and
  communicating a semi-persistent transmission in the first link direction in accordance with a first complementary configuration to a first configuration associated with full-duplex communications or a second complementary configuration to a second configuration associated with half-duplex communications, the communication of the semi-persistent transmission in accordance with the first complementary configuration or the second complementary configuration based at least in part on whether the semi-persistent transmission of the one or more semi-persistent transmissions overlaps in a time domain with a dynamic transmission in a second link direction, the second link direction being different from the first link direction.

30. The method of claim 29, further comprising:
transmitting, in the control signaling, a full-duplex configuration and a half-duplex configuration for the first wireless communication device to use to communicate the semi-persistent transmission, the first configuration comprising the full-duplex configuration and the second configuration comprising the half-duplex configuration.

31. The method of claim 28, further comprising:
identifying the full-duplex configuration based at least in part on an overlap in the time domain of the semi-persistent transmission in the first link direction with the dynamic transmission in the second link direction; and
identify the half-duplex configuration based at least in part on a failure of the semi-persistent transmission in the first link direction to overlap in the time domain with the dynamic transmission in the second link direction.

32. The method of claim 28, wherein the full-duplex configuration and the half-duplex configuration comprise different beams, different modulation and coding schemes, different precoding matrix indicators, different rank indicators, or a combination thereof.

33. The method of claim 27, further comprising:
receiving downlink control information that schedules the dynamic transmission in the second link direction; and
determining that the semi-persistent transmission overlaps in the time domain with the dynamic transmission based at least in part on the reception of the downlink control information.

34. The method of claim 30, further comprising:
identifying that the first wireless communication device is to use the full-duplex configuration to communicate the semi-persistent transmission based at least in part on an overlap in the time domain of the semi-persistent transmission in the first link direction with the dynamic transmission in the second link direction; and
identify that the first wireless communication device is to use the half-duplex configuration to communicate the semi-persistent transmission based at least in part on a failure of the semi-persistent transmission in the first link direction to overlap in the time domain with the dynamic transmission in the second link direction.

35. The method of claim 30, wherein the full-duplex configuration and the half-duplex configuration comprise different beams, different modulation and coding schemes, different precoding matrix indicators, different rank indicators, or a combination thereof.

36. The method of claim 29, further comprising:
transmitting downlink control information that schedules the dynamic transmission in the second link direction; and
determining that the semi-persistent transmission overlaps in the time domain with the dynamic transmission based at least in part on the transmission of the downlink control information.

37. A non-transitory computer-readable medium storing code for wireless communication at a first wireless communication device, the code comprising instructions executable by one or more processors to cause the first wireless communication device to:
receive control signaling allocating resources to the first wireless communication device for one or more semi-persistent transmissions in a first link direction; and
communicate a semi-persistent transmission in the first link direction in accordance with a first configuration associated with full-duplex communications or a second configuration associated with half-duplex communications, the communication of the semi-persistent transmission in accordance with the first configuration or the second configuration being based at least in part on whether the semi-persistent transmission of the one or more semi-persistent transmissions overlaps in a time domain with a dynamic transmission in a second link direction, the second link direction being different from the first link direction.

38. A non-transitory computer-readable medium storing code for wireless communication at a second wireless communication device, the code comprising instructions executable by one or more processors to cause the second wireless communication device to:
transmit, to a first wireless communication device, control signaling allocating resources for one or more semi-persistent transmissions in a first link direction; and
communicate a semi-persistent transmission in the first link direction in accordance with a first complementary configuration to a first configuration associated with full-duplex communications or a second complementary configuration to a second configuration associated with half-duplex communications, the communication of the semi-persistent transmission in accordance with the first complementary configuration or the second complementary configuration based at least in part on whether the semi-persistent transmission of the one or more semi-persistent transmissions overlaps in a time domain with a dynamic transmission in a second link direction, the second link direction being different from the first link direction.

\* \* \* \* \*